(12) United States Patent
Isozaki

(10) Patent No.: US 11,838,282 B2
(45) Date of Patent: *Dec. 5, 2023

(54) INFORMATION RECORDING APPARATUS WITH SERVER-BASED USER AUTHENTICATION FOR ACCESSING A LOCKED OPERATING SYSTEM STORAGE

(71) Applicant: Kioxia Corporation, Minato-ku (JP)

(72) Inventor: Hiroshi Isozaki, Kawasaki (JP)

(73) Assignee: Kioxia Corporation, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/689,173

(22) Filed: Mar. 8, 2022

(65) Prior Publication Data

US 2022/0200980 A1 Jun. 23, 2022

Related U.S. Application Data

(60) Continuation of application No. 16/711,592, filed on Dec. 12, 2019, now Pat. No. 11,297,045, which is a
(Continued)

(51) Int. Cl.
*H04L 9/40* (2022.01)
*G06F 21/85* (2013.01)
(Continued)

(52) U.S. Cl.
CPC .............. *H04L 63/08* (2013.01); *G06F 21/10* (2013.01); *G06F 21/31* (2013.01); *G06F 21/575* (2013.01);
(Continued)

(58) Field of Classification Search
CPC .......... G06F 1/10; G06F 21/31; G06F 21/575; G06F 21/80; G06F 21/85;
(Continued)

(56) References Cited

U.S. PATENT DOCUMENTS 6,711,688 B1 3/2004 Hubacher
7,559,091 B2 7/2009 Chu et al.
(Continued)

FOREIGN PATENT DOCUMENTS

JP 2000-215167 8/2000
JP 2003-196162 7/2003
(Continued)

OTHER PUBLICATIONS

International Written Opinion dated Jun. 8, 2010, issued for International Application No. PCT/JP2010/055426 filed Mar. 26, 2010 (English).
(Continued)

*Primary Examiner* — Ji H Bae
(74) *Attorney, Agent, or Firm* — Oblon, McClelland, Maier & Neustadt, L.L.P.

(57) ABSTRACT

An information recording apparatus has a drive unit to record digital information including digital contents; and a host unit to control reading and writing of the digital information for the drive unit. The host unit has a network processing unit to communicate with a server, a shadow determination unit to determine whether a shadow boot program to be executed prior to a boot program is executable, a shadow reading unit to read the shadow program from the drive unit when the shadow determination unit determines to be executable, a shadow execution unit to execute the shadow program, a server authentication unit to perform authentication with the server in accordance with a processing of the shadow program, and a password transmitter to transmit to the drive unit a password used for unlock of the drive unit when the authentication with the server is successful.

19 Claims, 23 Drawing Sheets

Related U.S. Application Data continuation of application No. 15/647,408, filed on Jul. 12, 2017, now Pat. No. 10,547,604, which is a division of application No. 15/055,686, filed on Feb. 29, 2016, now Pat. No. 9,756,033, which is a continuation of application No. 13/626,972, filed on Sep. 26, 2012, now abandoned, which is a continuation of application No. PCT/JP2010/055426, filed on Mar. 26, 2010.

(51) Int. Cl.
| | |
|---|---|
| *H04L 9/32* | (2006.01) |
| *G06F 21/80* | (2013.01) |
| *G06F 21/57* | (2013.01) |
| *G06F 21/31* | (2013.01) |
| *G06F 21/10* | (2013.01) |

(52) U.S. Cl.
CPC .............. *G06F 21/80* (2013.01); *G06F 21/85* (2013.01); *H04L 9/3226* (2013.01); *H04L 63/062* (2013.01); *H04L 63/0823* (2013.01); *G06F 2221/2141* (2013.01); *G06F 2221/2147* (2013.01); *H04L 63/0428* (2013.01)

(58) Field of Classification Search
CPC ..... G06F 2221/2141; G06F 2221/2147; H04L 63/08; H04L 9/3226; H04L 63/062; H04L 63/0823; H04L 63/0428
USPC .................. 713/1, 2, 155, 193; 726/4–7, 28
See application file for complete search history.

(56) References Cited

U.S. PATENT DOCUMENTS

| | | | |
|---|---|---|---|
| 7,984,283 B2 | 7/2011 | Peacock et al. | |
| 9,756,033 B2* | 9/2017 | Isozaki | H04L 63/0823 |
| 10,547,604 B2* | 1/2020 | Isozaki | H04L 63/0823 |
| 11,297,045 B2* | 4/2022 | Isozaki | H04L 63/0823 |
| 2002/0178366 A1 | 11/2002 | Ofir | |
| 2003/0084316 A1 | 5/2003 | Schwartz | |
| 2003/0208686 A1 | 11/2003 | Thummalapally | |
| 2003/0217278 A1 | 11/2003 | Kimura | |
| 2005/0081064 A1 | 4/2005 | Ooi et al. | |
| 2006/0047946 A1 | 3/2006 | Keith, Jr. | |
| 2006/0278701 A1 | 12/2006 | Matsushita | |
| 2007/0061561 A1 | 3/2007 | Hashiguchi | |
| 2007/0180515 A1 | 8/2007 | Danilak | |
| 2008/0104409 A1 | 5/2008 | Matsuoka | |
| 2008/0133905 A1 | 6/2008 | Challener et al. | |
| 2010/0011350 A1 | 1/2010 | Zayas | |
| 2010/0058066 A1 | 3/2010 | Wang | |
| 2010/0153697 A1 | 6/2010 | Ford | |
| 2010/0191944 A1 | 7/2010 | Numata | |
| 2010/0223667 A1 | 9/2010 | Acuna | |
| 2011/0202765 A1* | 8/2011 | McGrane | G06F 21/80 713/168 |

FOREIGN PATENT DOCUMENTS

| | | |
|---|---|---|
| JP | 2009-246459 | 10/2009 |
| JP | 2010-20753 | 1/2010 |

OTHER PUBLICATIONS

"TCG Storage Architecture Core Specification", Specification Version 2.00 Final Revision 1.00, Trusted Computing Group, Apr. 20, 2009. pp. 1-314.

"TPM Main Part 2 TPM Structures", Specification Version 1.2 Level 2 Revision 103, Oct. 26, 2006, Trusted Computing Group. pp. 1-186.

International Preliminary Report on Patentability and Written Opinion dated Nov. 1, 2012 in PCT/JP2010/055426 filed Mar. 26, 2010.

Trusted Computing Group, "Self-Encrypting Drives", 13 pages.

TCG Storage Security Subsystem Class: Opal, Specification Version 2.01 Revision 1.00, Trusted Computing Group, Aug. 5, 2015, 80 pages.

* cited by examiner

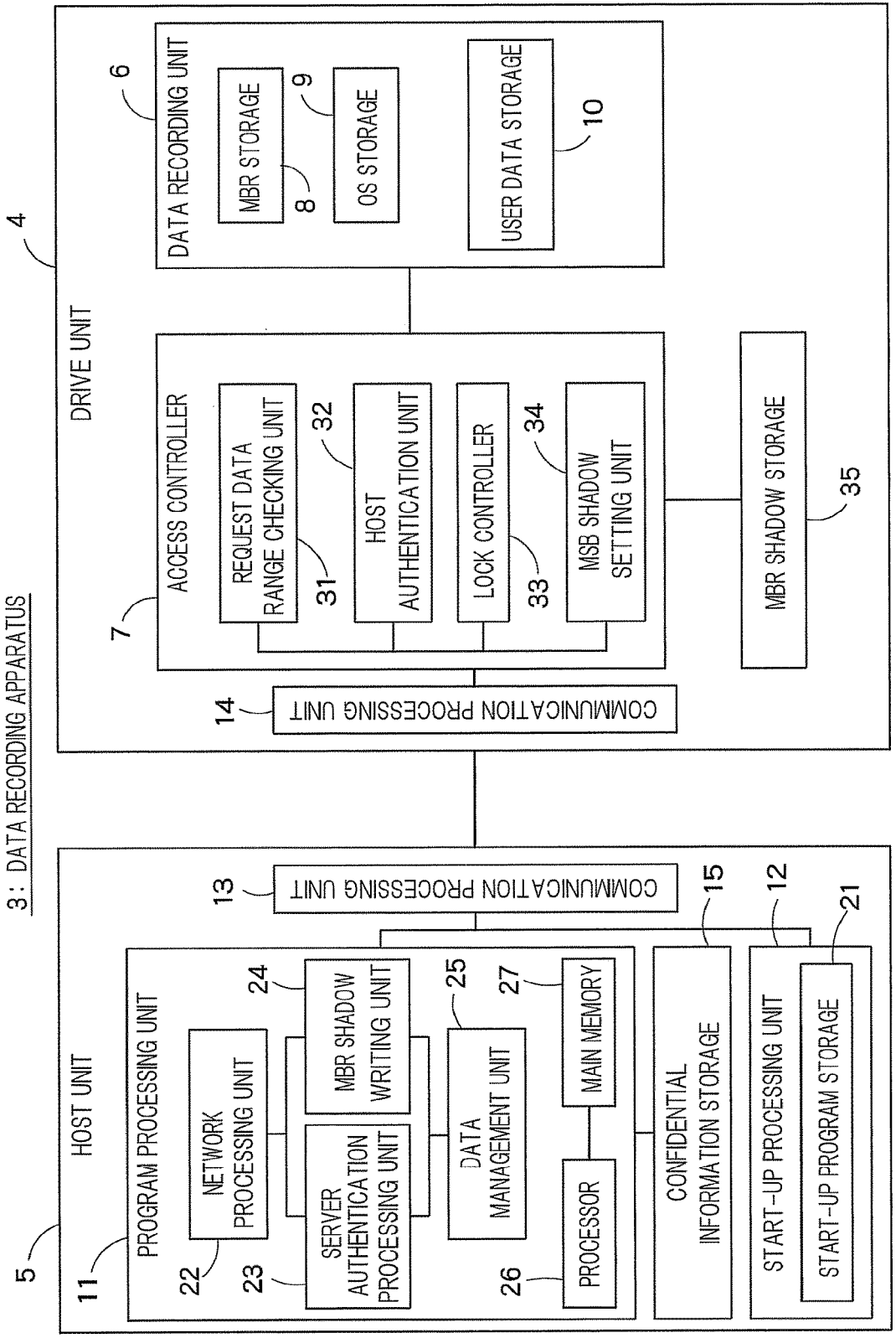
F I G. 4

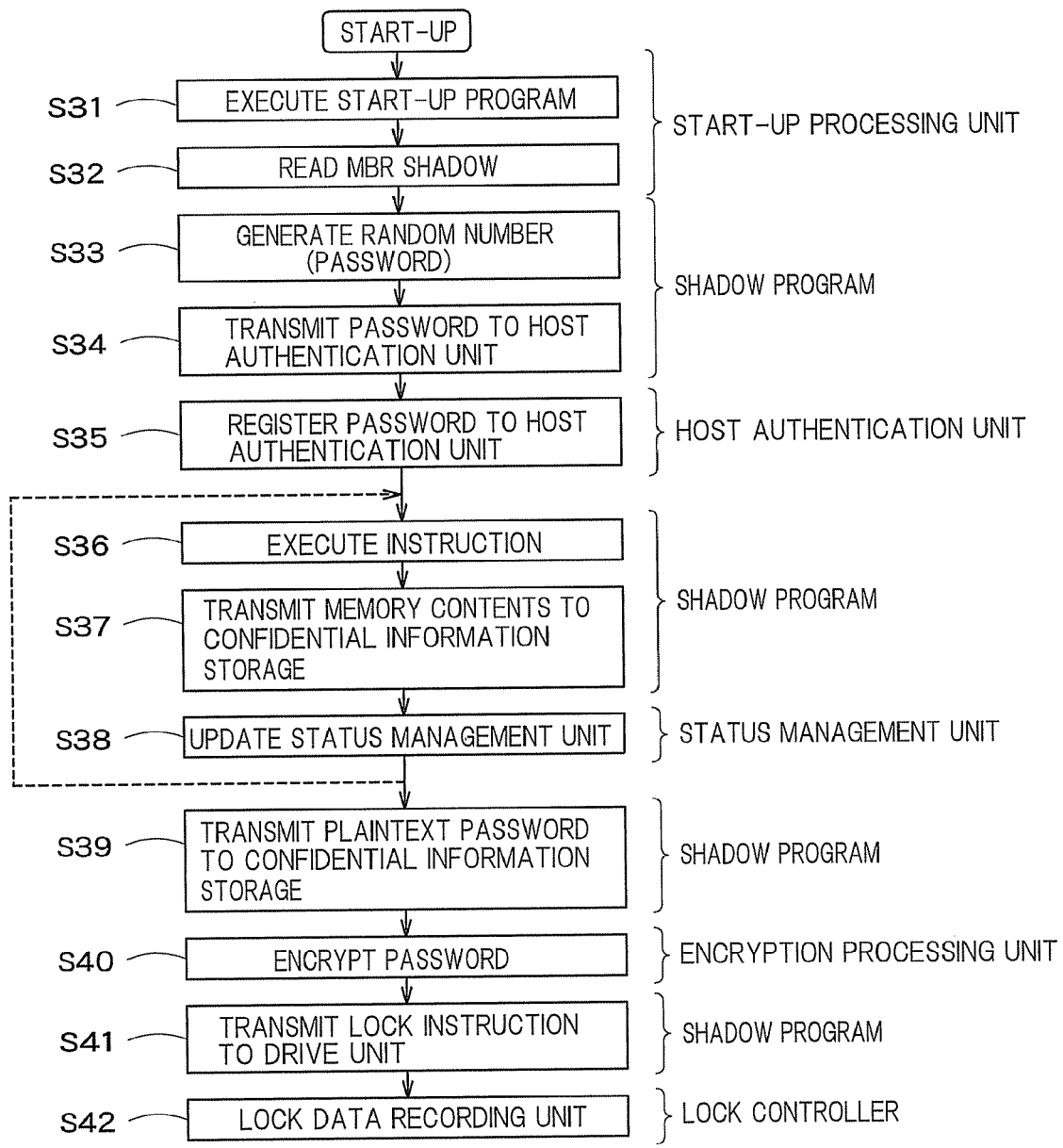
F I G. 7

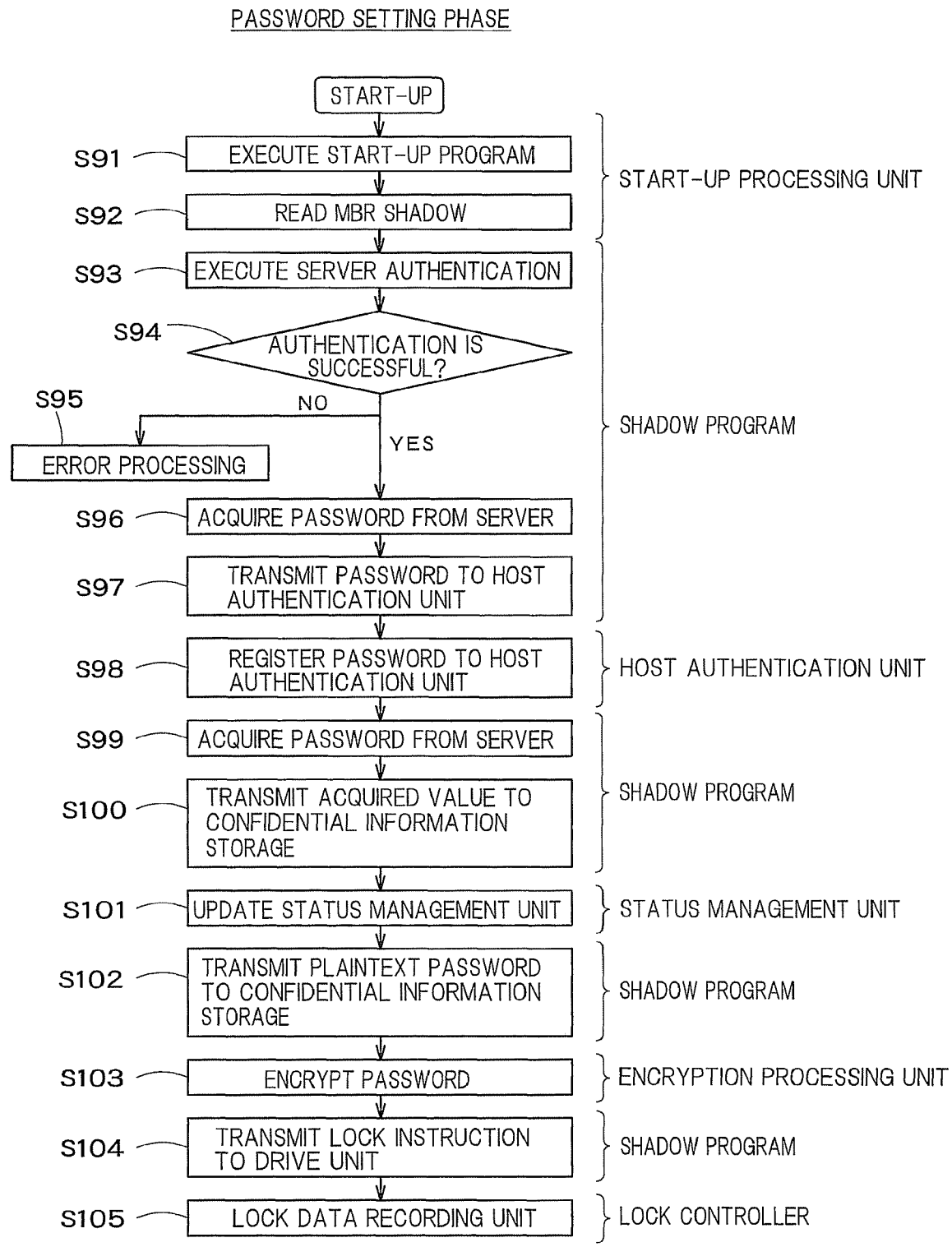
F I G. 10

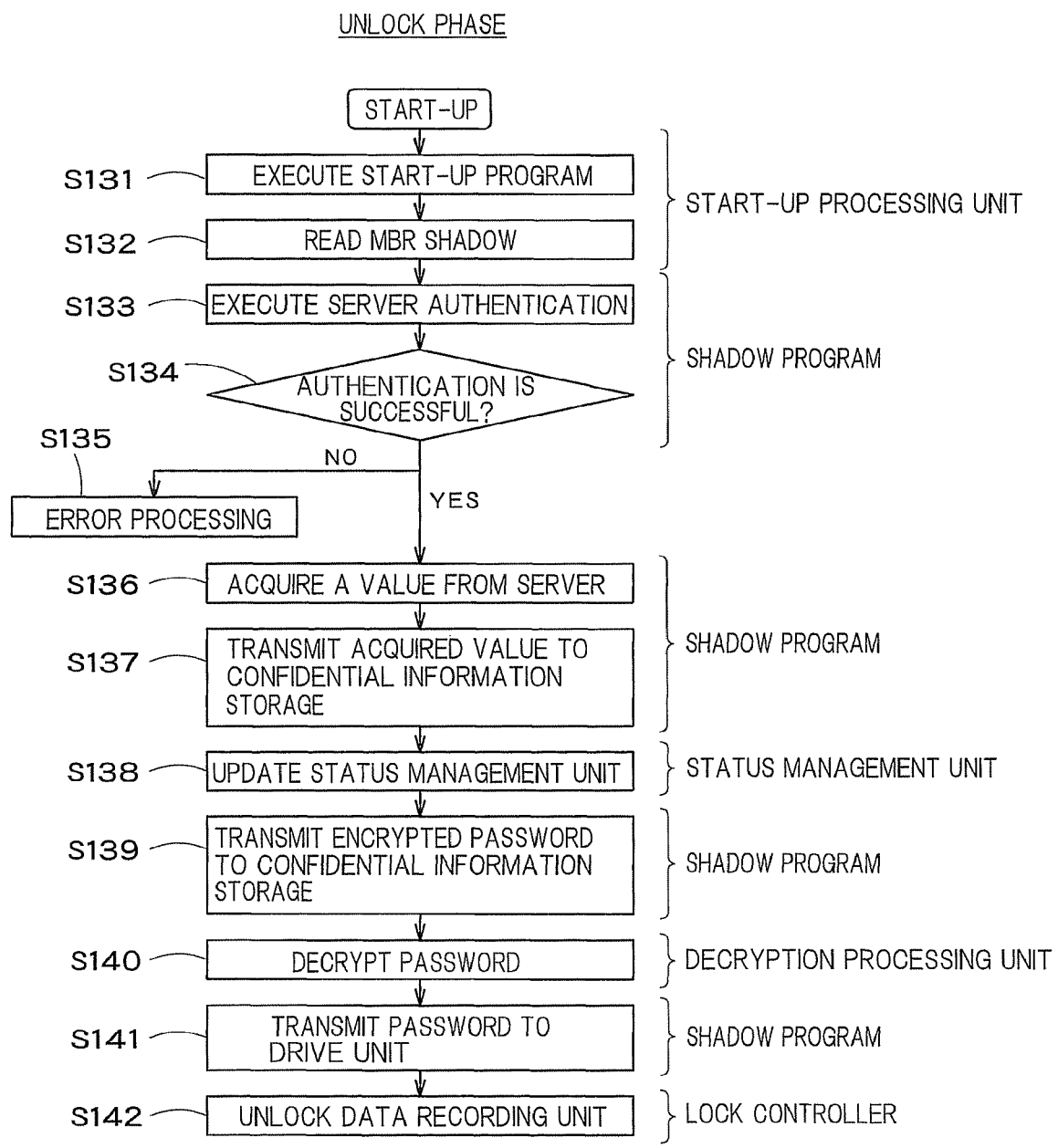
F I G. 12

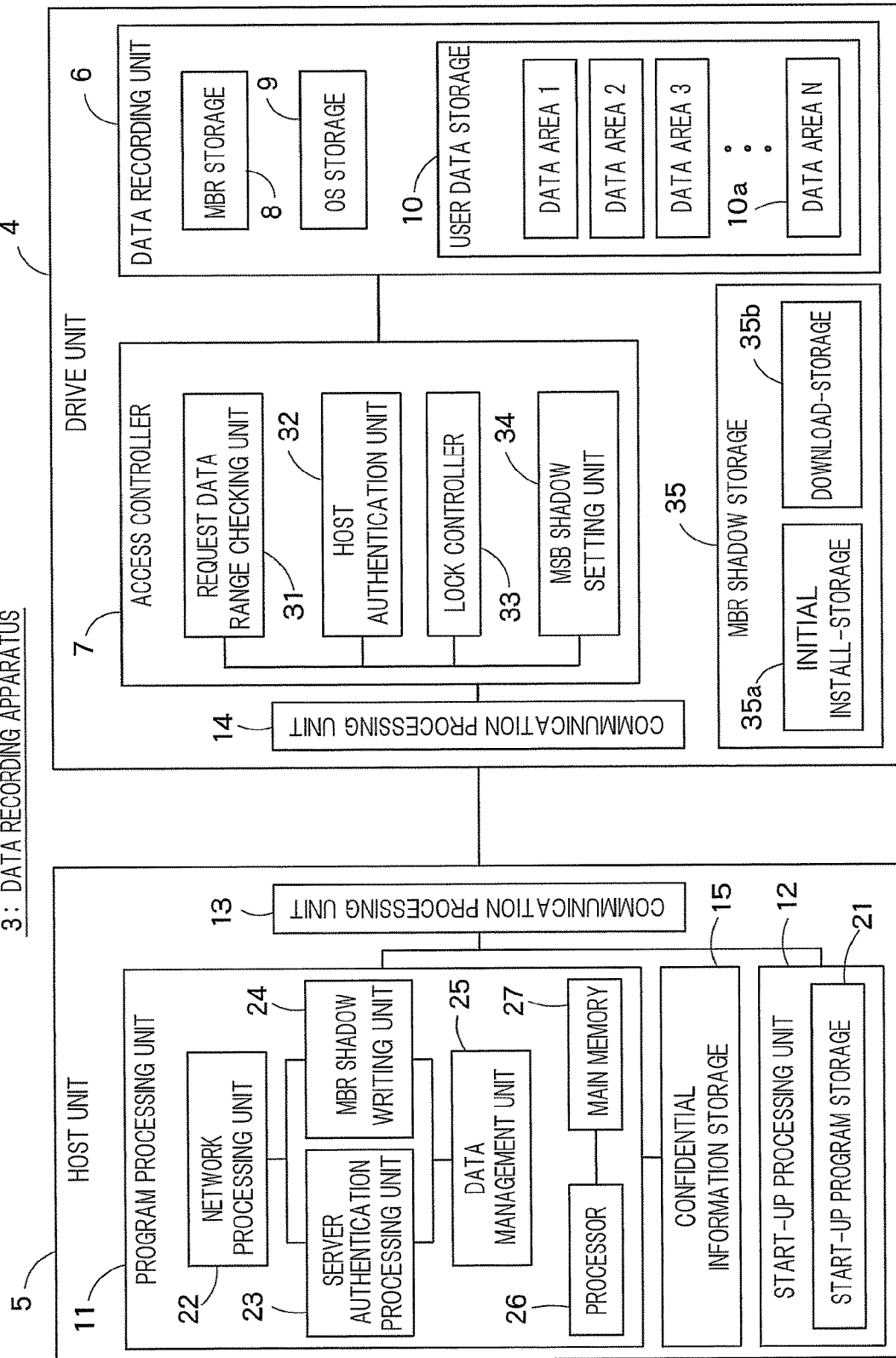
F I G. 13

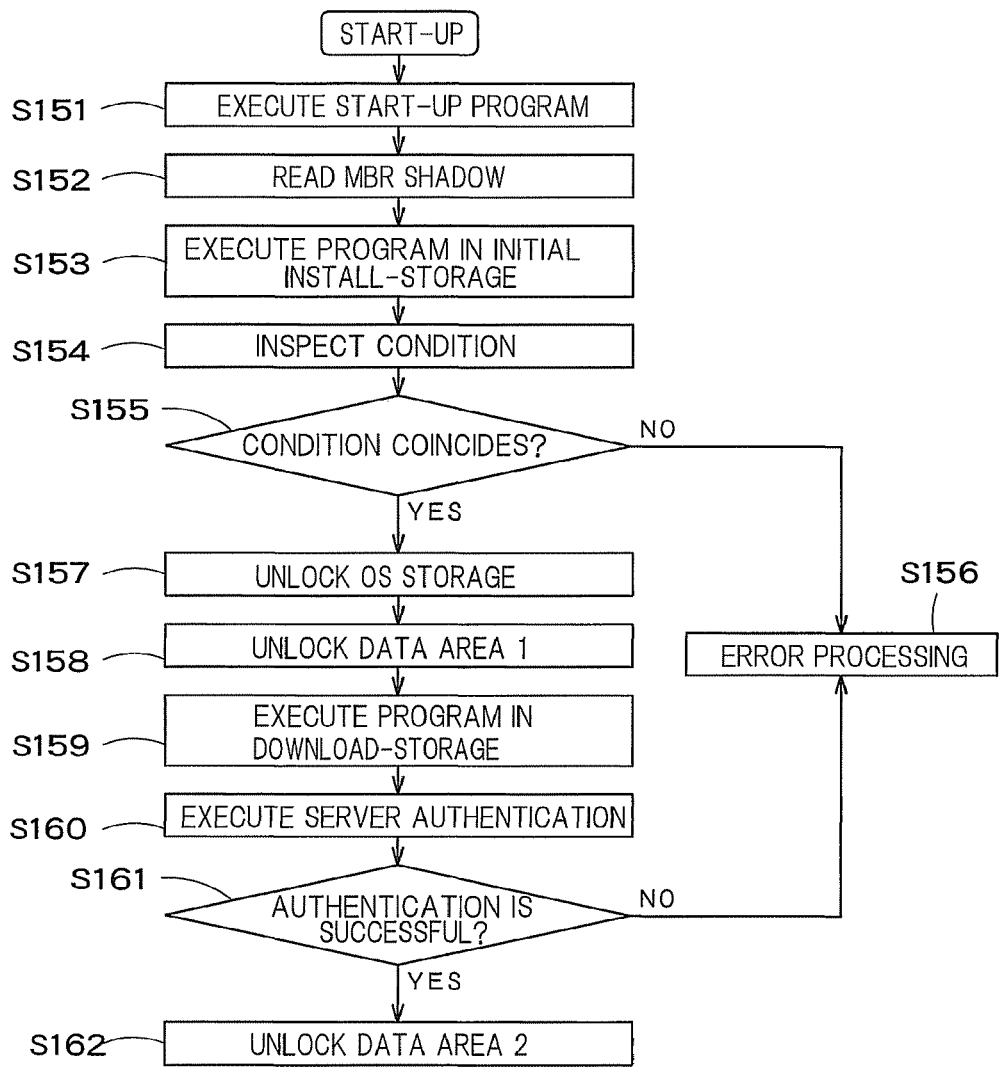
F I G. 14

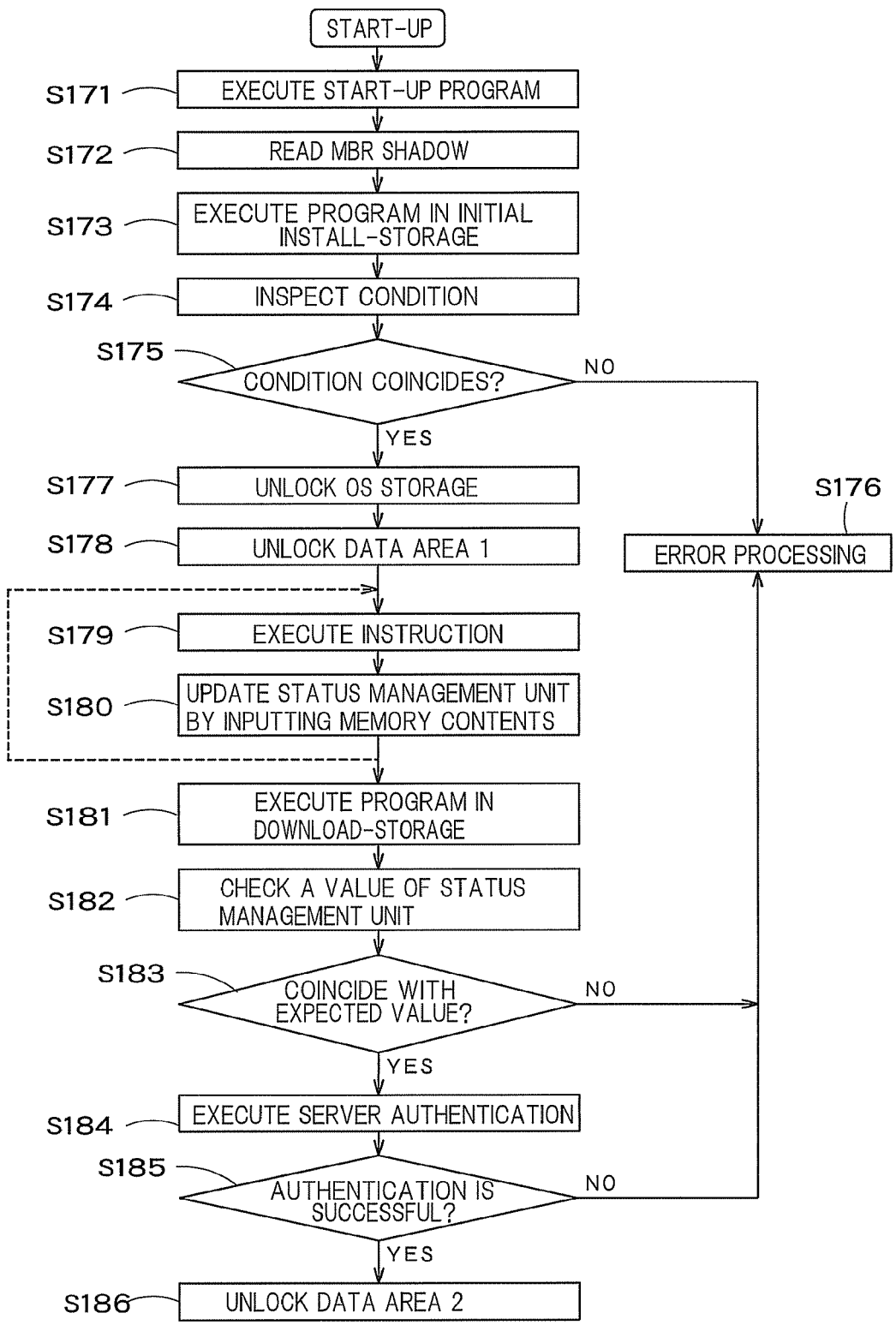
F I G. 15

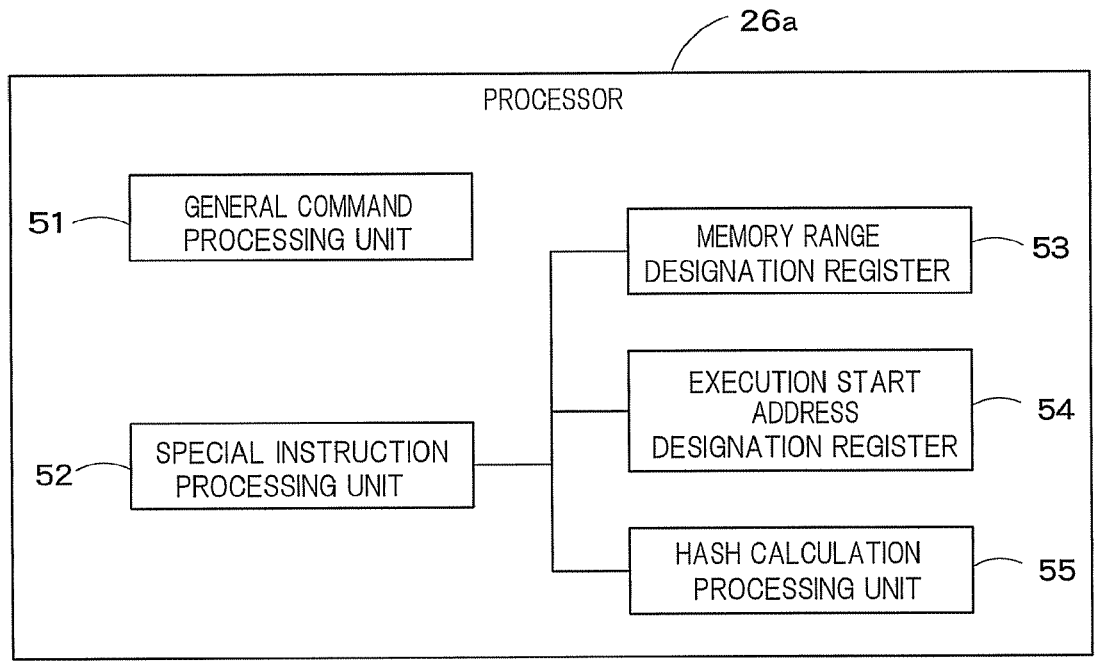
F I G. 17
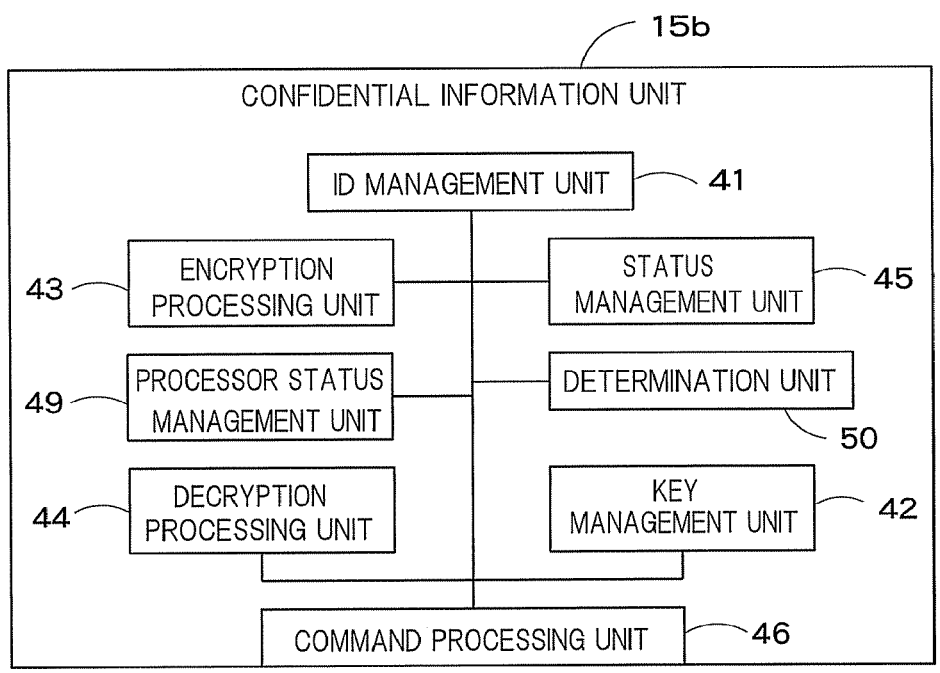
F I G. 18

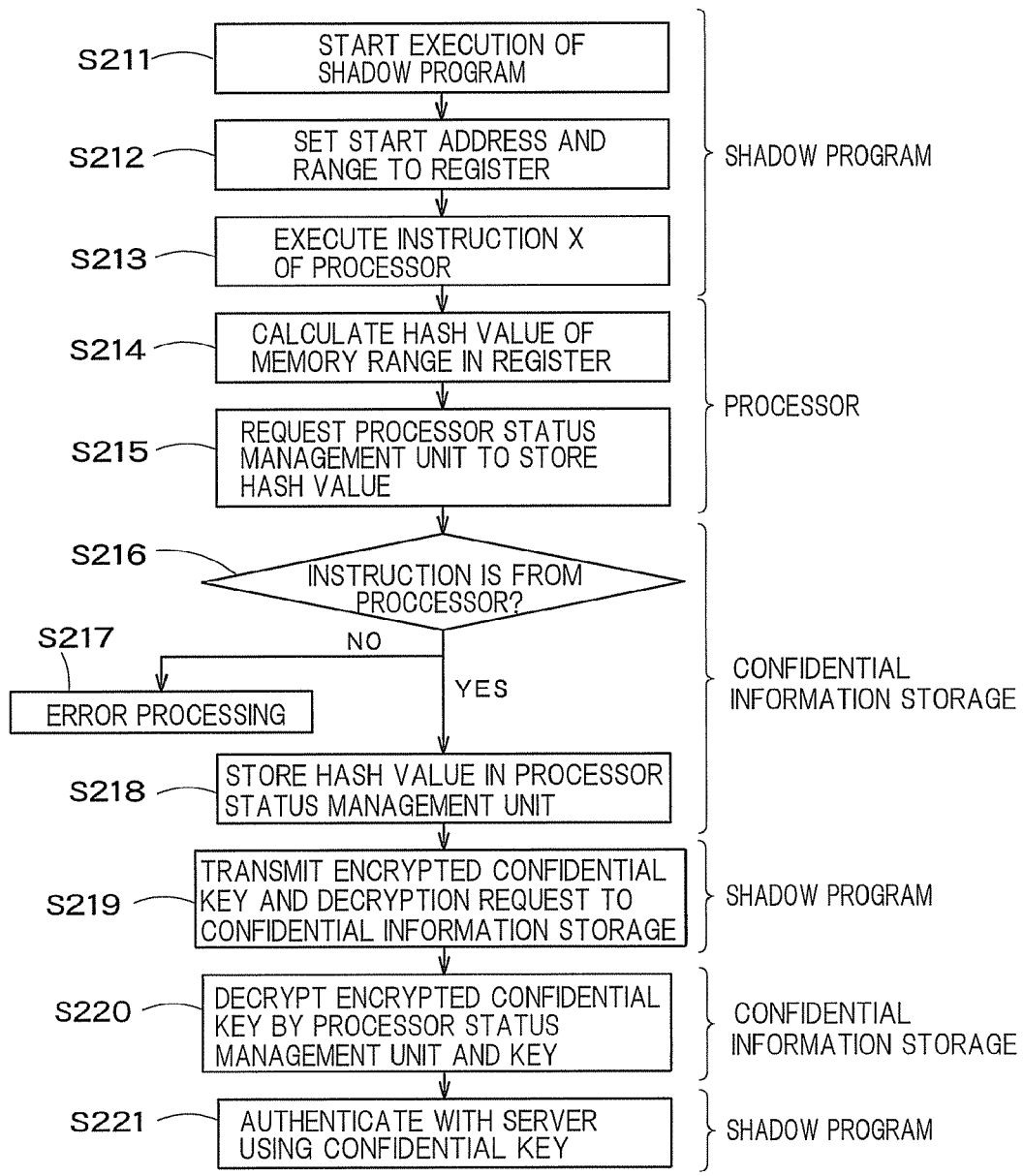
F I G. 20

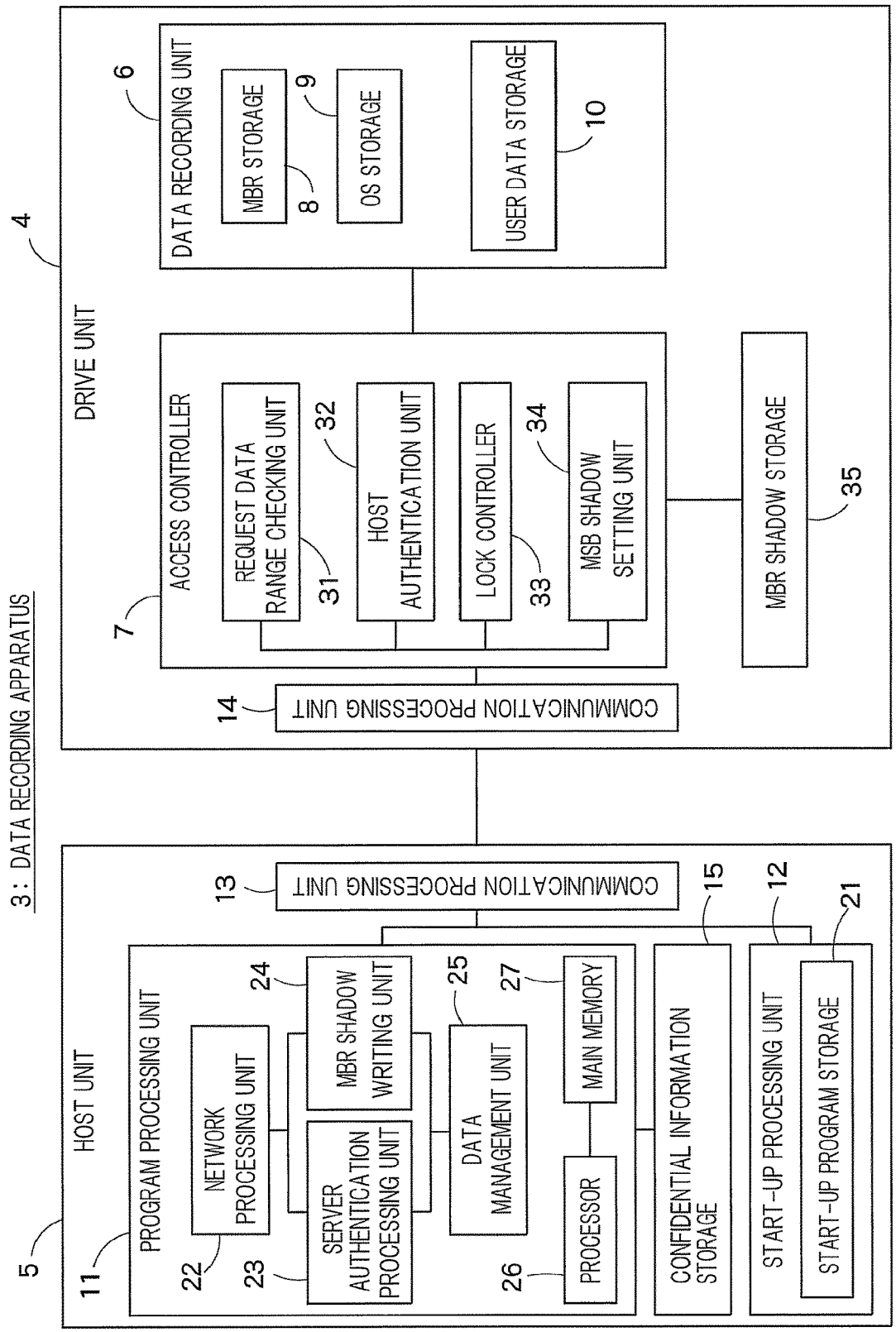
F I G. 21

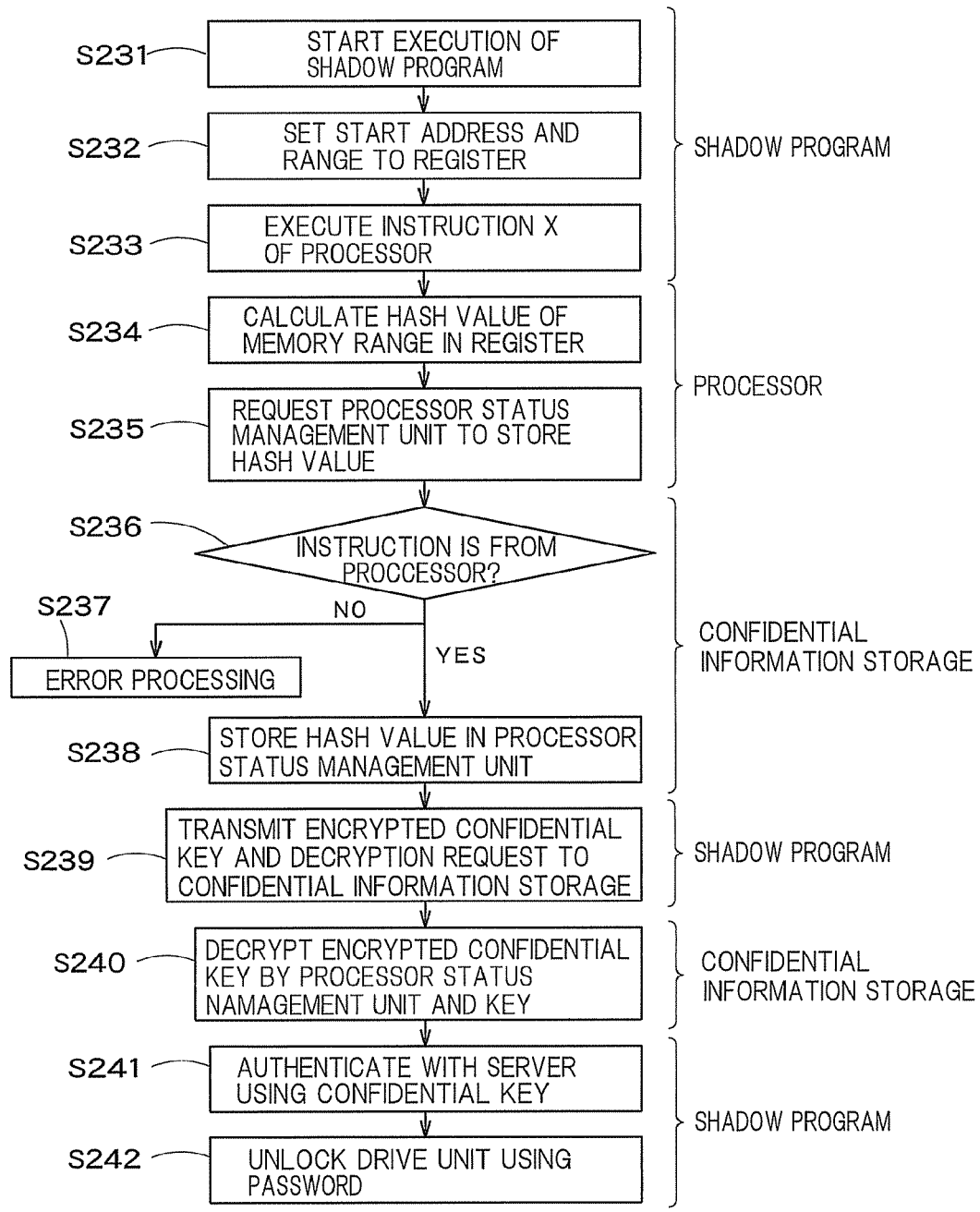
F I G. 22

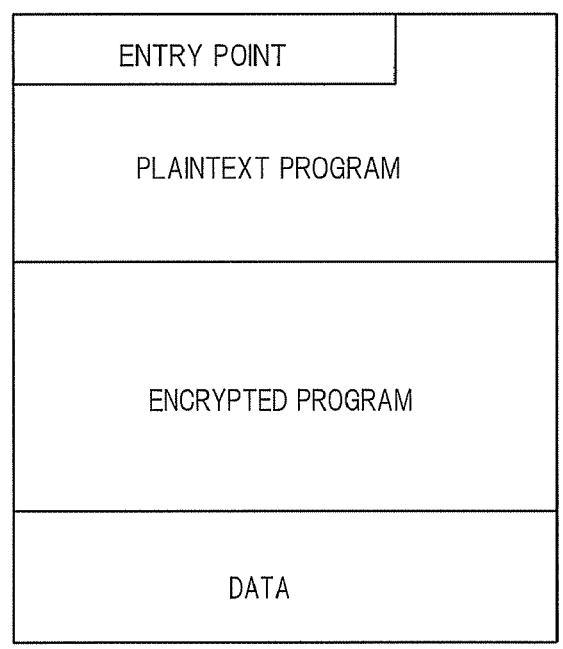
F I G. 23

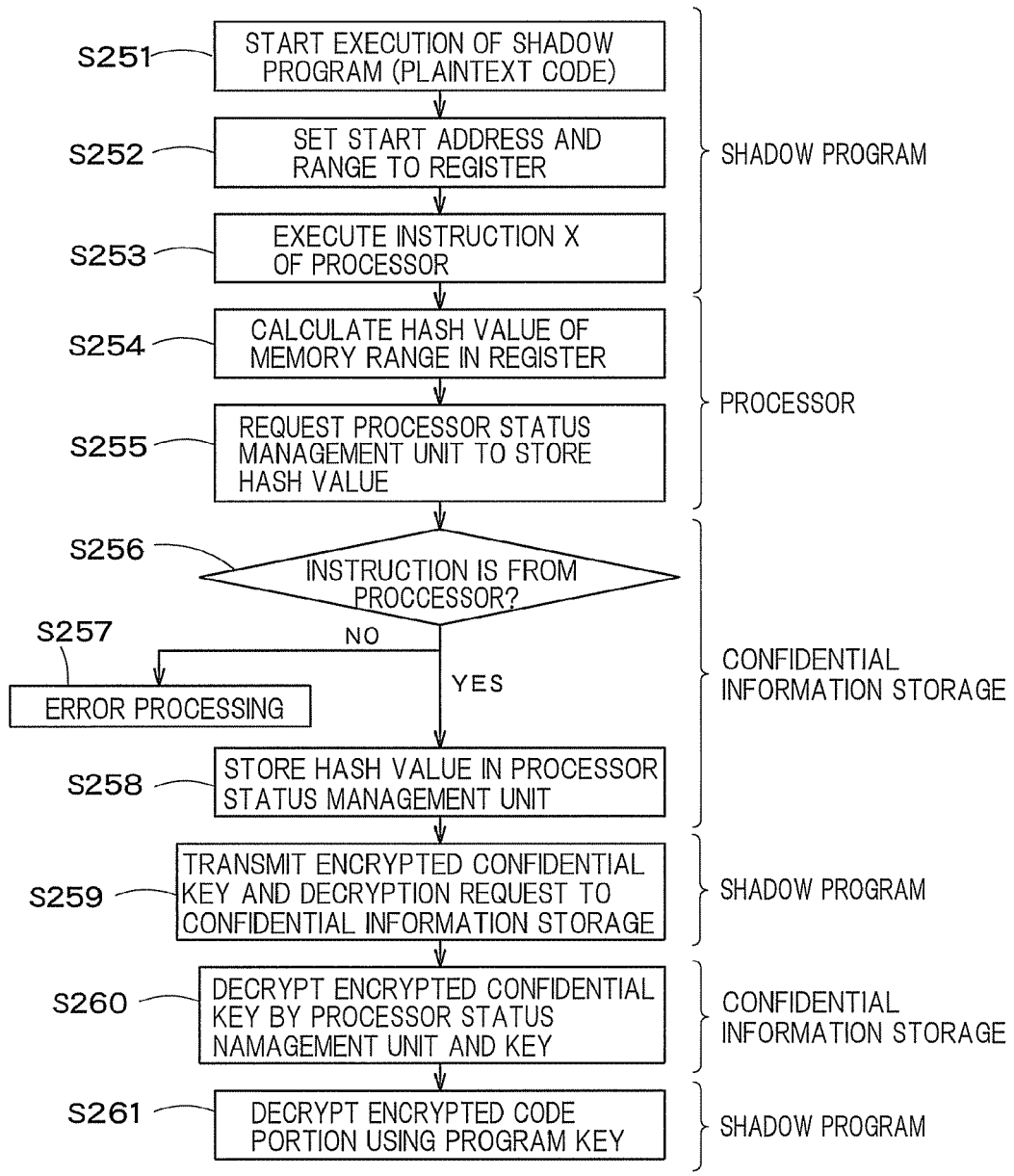
F I G. 24

INFORMATION RECORDING APPARATUS WITH SERVER-BASED USER AUTHENTICATION FOR ACCESSING A LOCKED OPERATING SYSTEM STORAGE

CROSS REFERENCE TO RELATED APPLICATIONS

This application is a continuation of and claims the benefit of priority under 35 U.S.C. § 120 from U.S. application Ser. No. 16/711,592 filed Dec. 12, 2019, which is a continuation of U.S. application Ser. No. 15/647,408 filed Jul. 12, 2017 (now U.S. Pat. No. 10,547,604 issued Jan. 28, 2020), which is a division of U.S. application Ser. No. 15/055,686 filed Feb. 29, 2016 (now U.S. Pat. No. 9,756,033 issued Sep. 5, 2017), which is a continuation of U.S. Ser. No. 13/626,972 filed Sep. 26, 2012, which is a continuation of PCT/JP2010/055426 filed Mar. 26, 2010, the entire contents of each of which are incorporated herein by reference.

FIELD

This disclosure relates to an information recording apparatus for recording network services and contents etc. which need copyright protection.

BACKGROUND

Recently, there has been proposed various techniques, such as a technique for providing encryption function in a storage device such as an HDD or an SSD and for encrypting data to be stored in the storage device and storing the encrypted data, and the other technique for registering a PIN code (password) to the storage device and permitting access to the storage device only when a correct PIN code is inputted.

On the other hand, the conventional PC system generally adopts a technique for installing an application for content distribution by each service provider or each service and including the private information or the algorism for storing the confidential information in the application to encrypt the confidential information and store the encrypted confidential information as a file.

However, since software has to be made in a form executable by a CPU, the private information can be acquired by analyzing instructions executed by the CPU one step by one step.

Furthermore, it is generally difficult to permit a user to add an application specific to a certain service from restriction on performance of electronic appliances. Therefore, in order to additionally make the electronic appliance corresponding to a service of the service provider, it is desirable to have a technique for properly protecting information of the service provider as a platform of the electronic appliance without depending on the service provider. Even in a PC system, if a commonly applicable platform can be used regardless of the service provider or the service, it is possible to produce the electronic appliance at low cost.

BRIEF DESCRIPTION OF THE DRAWINGS

FIG. 4 is a block diagram showing one example of a data recording apparatus of the second embodiment.

FIG. 7 is a flowchart showing one example of the processing of the password setting phase.

FIGS. 10 and 11 are flowchart showing one example of the processing of the password setting phase.

FIG. 12 is a flowchart showing an example of the processing of the unlock phase corresponding to a case of storing the value acquired from the server 1.

FIG. 13 is a block diagram showing schematic configuration of the data recording apparatus 3 of the third embodiment.

FIG. 14 is a flowchart showing one example of the processing of the unlock phase.

FIG. 15 is a flowchart of adding confirmation processing.

FIG. 17 is a block diagram showing one example of internal configuration of the processor 26a.

FIG. 18 is a block diagram showing one example of the confidential information storage 15b of the fourth embodiment.

FIG. 20 is a flowchart showing one example of processing of the shadow program of the fourth embodiment.

FIG. 21 is a block diagram showing one example of the data recording apparatus 3 of the fourth embodiment.

FIG. 22 is a flowchart showing one example of processing of the unlock phase of the fourth embodiment.

FIG. 23 is a drawing showing one example of structure of the shadow program of the fifth embodiment.

FIG. 24 is a flowchart showing one example of decryption processing procedure of the fifth embodiment.

DETAILED DESCRIPTION

According to one embodiment of an information recording apparatus has a drive unit to record digital information including digital contents, and a host unit to control reading and writing of the digital information for the drive unit. The host unit has a network processing unit to communicate with a server, a shadow determination unit to determine whether a shadow boot program to be executed prior to a boot program is executable, a shadow reading unit to read the shadow program from the drive unit when the shadow determination unit determines to be executable, a shadow execution unit to execute the shadow program, a server authentication unit to perform authentication with the server in accordance with a processing of the shadow program, and a password transmitter to transmit to the drive unit a password used for unlock of the drive unit when the authentication with the server is successful. The drive unit has a shadow boot program storage to store the shadow boot program, a boot program storage to store the boot program, a user data storage to store user data including arbitrary digital data, a password verification unit to determine whether the password transmitted from the host unit coincides with a password registered in advance, and a lock controller to unlock the user data storage and to permit access to the user data storage when the password verification unit determines to coincide with the password.

Embodiments will now be explained with reference to the accompanying drawings.

First Embodiment

Figure 1:
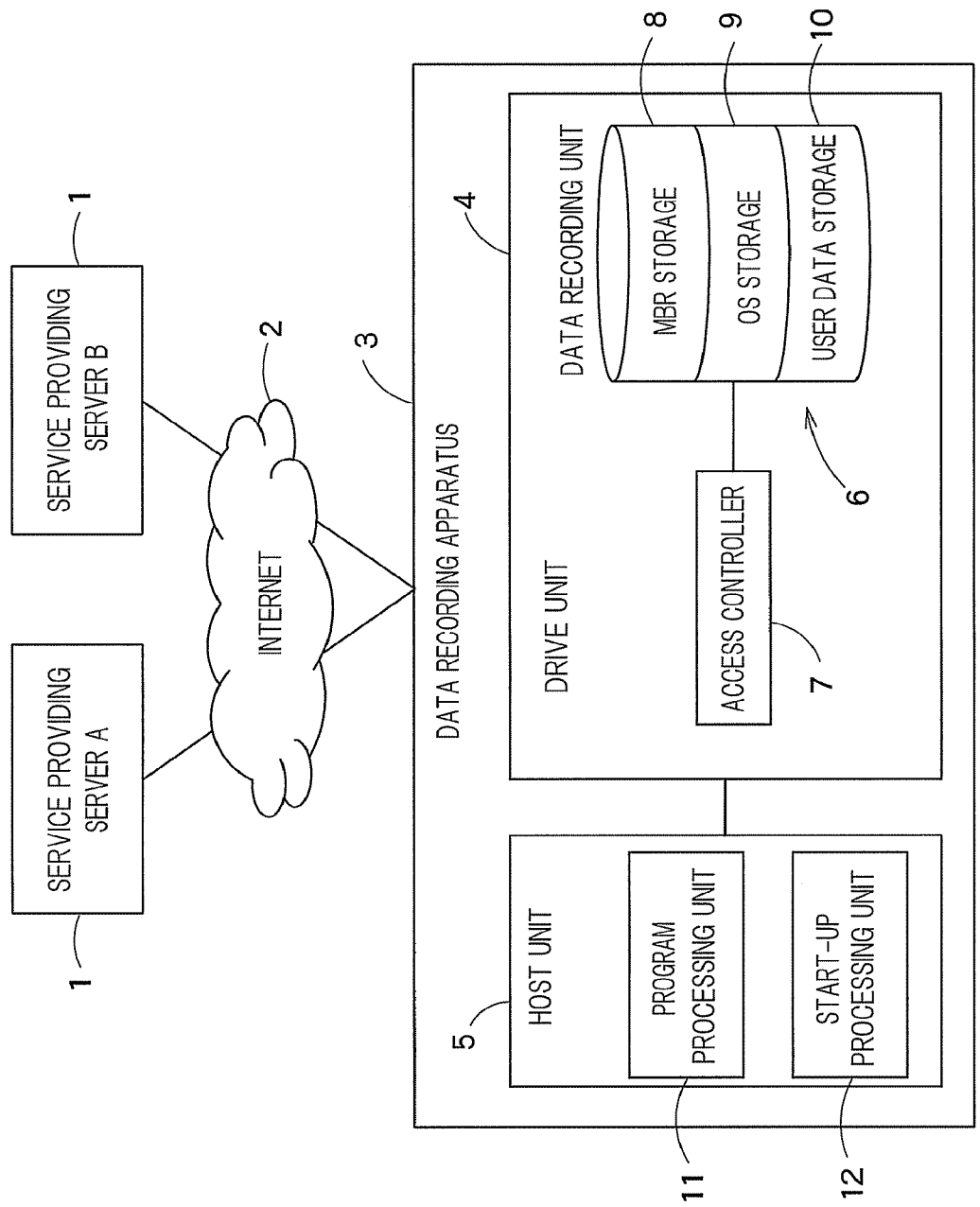
FIG. 1 is a block diagram showing an entire configuration of an information processing system of a first embodiment.

FIG. 1 is a block diagram showing an entire configuration of an information processing system according to a first embodiment. The information processing system in FIG. 1 has a data recording apparatus 3 capable of receiving and storing digital information via an internet 2 from a server 1 such as service providing servers A and B. In FIG. 1, the data recording apparatus 3 and the server 1 connected to internet 2 may be connected to a router etc. not shown.

The data recording apparatus 3 and the server 1 can adopt various communication platforms such as a wireless LAN compliant with IEEE802.11 or Ethernet as a physical layer and a link layer. IPv4 and IPv6 are applicable as a network layer when an internet protocol (IP) is used.

Here, the digital information indicates, for example, motion picture data such as MPEG2 or MPEG4, audio data such as MP3, or digitized contents such as text data or image data. The digital information can also contain personal information such as a number of a credit card owned by user.

The data recording apparatus 3 according to the first embodiment has a drive unit 4 and a host unit 5 as a main configuration. The drive unit 4 assumes an apparatus for recording digital information such as a hard disk drive (HDD) or a solid state drive (SSD). Inside of the drive unit 4 is provided with a data recording unit 6 and an access controller 7. On the other hand, the host unit 5 has a function of processing data of a CPU, a memory or a communication interface etc. and a function of communicating with the service providing server 1. The host unit 5 is connected with the drive unit 4 by a bus interface such as an IDE, an SCSI or a USB.

The data recording unit 6 performs the processing of storing digital information such as AV data, for example, moving picture data, data generated by user and data received from the service providing server 1. The host unit 5, more accurately, an OS processed in the host unit 5 manages these data and addresses thereof.

The host unit 5 designates an address of the data recording unit 6, i.e. logical block address, when data is read out from the data recording unit 6. The data recording unit 6 transmits data stored in the designated address, to the host unit 5. The data recording unit 6 may be divided logically so that the host unit 5 can recognize the data recording unit 6 as multiple independent logical areas (partitions).

In an example of FIG. 1, the data recording unit 6 is logically divided into an MBR storage 8, an OS storage 9 and a user data storage 10. The MBR storage 8 has an area for storing a program (boot program) executed at start-up timing, which is called an MBR (Master Boot Record). The OS storage 9 stores the OS. The user data storage 10 stores and manages AV data, data generated by user, data received from the service providing server 1, i.e. user data, or the like. The user data may be any type of digital data owned by user, for example, text file, moving picture data or image data etc. The user data may be data inputted using a keyboard or a microphone by user, private data took using a digital camera or a camcorder by user, commercial data made by a contents provider and purchased by user with charge or charge-free, or data received from a friend or a family. The OS storage 9 and the user data storage 10 may be consolidated to one area, although these storages are separated from each other in this embodiment.

The host unit 5 has a program processing unit 11 and a start-up processing unit 12. The program processing unit 11 processes the start-up processing and OS etc. The start-up processing unit 12 stores a program executed for loading the MBR at start-up timing. In order to store the program, it is possible to use BIOS or a general storage such as a flash memory built in the apparatus.

When the data recording apparatus 3 is started up, the processor executes the program stored in the start-up processing unit 12. In the program, a processing for initializing the system and the like are firstly conducted, and then the boot program is read out from the MBR storage 8 to execute it. In other words, the boot program is firstly executed among programs stored in the data recording unit 6. The boot program checks how areas of the data recording unit 6 is set, and then the host unit 5 reads out the OS from the OS storage to execute it. The OS executes an application for communicating with the service providing server 1 and the like.

The access controller 7 in the drive unit 4 determines whether the host unit 5 may access the data storage 6. The access controller 7 has functions of determining a read lock for rejecting data read request transmitted from the host unit 5, a write lock for rejecting data write request, or both lock. The read lock and the write lock can be set independently, for example, read is permitted but write is inhibited. The setting and control of the read lock and the write lock may be able to set for each partition. The manner of setting the read lock and the write lock and the manner of unlocking the lock will be described later.

Figure 2:
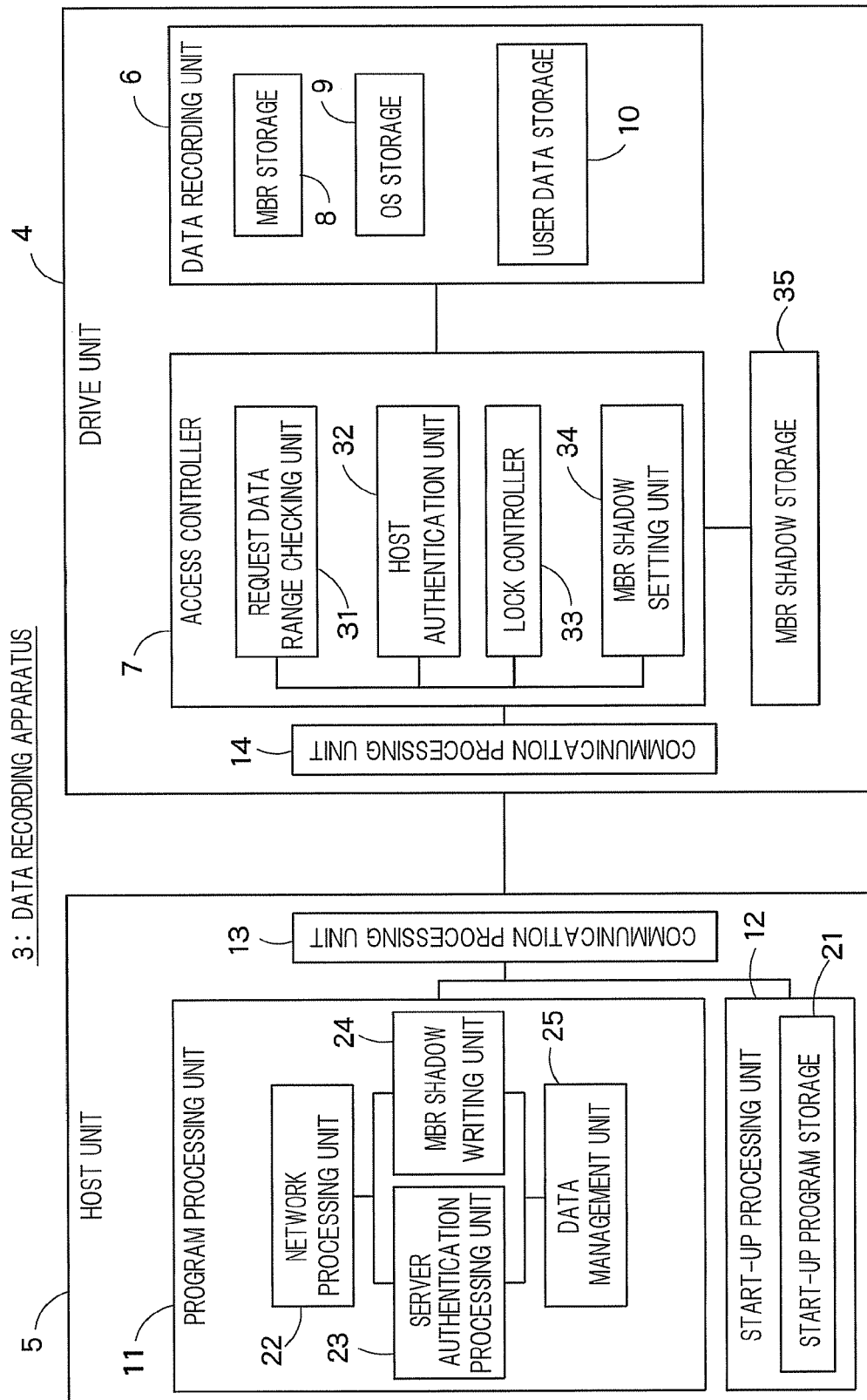
FIG. 2 is a block diagram showing one example of internal configuration of the data recording apparatus 3.

FIG. 2 is a block diagram showing one example of internal configuration of the data recording apparatus 3 in FIG. 1. Hereinafter, detailed configuration of the host unit 5 will be explained with reference to FIG. 2. The host unit 5 has a communication processing unit 13 for communicating with the drive unit 4, in addition to the above described program processing unit 11 and the start-up processing unit 12. The start-up processing unit 12 has a start-up program storage 21 for storing a program executed for loading the boot program.

The program processing unit 11 has a network processing unit 22, a server authentication processing unit 23, an MBR shadow writing unit 24 and a data management unit 25. The network processing unit 22 performs a physical layer processing for communicating with the service providing server 1, a data link layer processing, a network layer processing and a transport layer processing. The server authentication processing unit 23 performs authentication processing with the service providing server 1.

The MBR shadow writing unit 24 writes a shadow boot program described later into the MBR shadow storage in the drive unit 4. The data management unit 25 performs data read or write for the OS storage 9 and the user data storage 10. The communication processing unit 13 communicates with the drive unit 4. More specifically, the communication processing unit 13 transmits and receives various information with the communication processing unit 14 in the drive unit 4.

Next, detailed configuration of the drive unit 4 will be explained. The access controller 7 in the drive unit 4 a request data range checking unit 31, a host authentication unit 32, a lock controller 33 and an MBR shadow setting unit 34. A MBR shadow storage 35 is connected to the MBR shadow setting unit 34.

When the host unit 5 requests data read or write to the drive unit 4 by address designation, the request data range checking unit 31 determines whether a portion corresponding to the designated address is in the read lock state or the write lock state. If in the read lock state or the write lock state, an error is returned and access to the data recording unit 6 is inhibited. If in the unlock state, i.e. if not in lock state, it is permitted that the host unit 5 accesses data corresponding to the address. The host authentication unit 32 performs authentication processing with the host unit 5 via the communication processing unit 13. The lock control unit 33 controls setting of lock for the data recording unit 6. That is, the lock control unit 33 checks authentication result by the host authentication unit 32, and only when the authentication is successful, permits release and setting of lock. The MBR shadow setting unit 34 sets the shadow program to the MBR shadow storage 35 or manages whether the MBR shadow function is effective. As the processing procedure, the MBR shadow setting unit 34 checks the authentication result of the host authentication unit 32, and only when the authentication is successful, writes the shadow program into the MBR shadow storage 35, or sets validity or invalidity of the MBR shadow function.

When the program is preliminarily written into the MBR shadow storage 35 at shipping, or the apparatus is shipped with a fixed setting of validity or invalidity of the MBR shadow function, the MBR shadow setting unit 34 is not necessarily inevitable.

Next, the MBR shadow function for setting ON or OFF by the MBR shadow setting unit 34 will be explained. As described before, when the data recording apparatus 3 is started up, the program stored in the start-up processing unit 12 tries to read and execute the program for booting the apparatus. OFF of the MBR shadow function is set to the MBR shadow setting unit 34, a program stored in the MBR storing unit 8 in the data recording unit 6 is read out. On the other hand, when ON of the MBR shadow function is set to the MBR shadow setting unit 34, even if the drive unit 4 designates the address in the MBR storing unit 8, data recorded in the MBR shadow storage 35, i.e. the shadow program, but not the boot program stored in the MBR storage 8 is transmitted to the host unit 5. That is, when the MBR shadow function is ON, the shadow program stored in the MBR shadow storage 35 is executed following to the program stored in the start-up processing unit 12.

The data recording apparatus 3 according to the present embodiment has a function that the host unit 5 locks the data recording unit 6. The data recording apparatus 3 has a characteristic in which the program stored in the MBR shadow storage 35 is executed prior to the OS or the application operating on the OS, the authentication with the service providing server 1 is conducted on the program, and lock release of the data recording unit 6 is controlled based on the authentication result.

Figure 3:
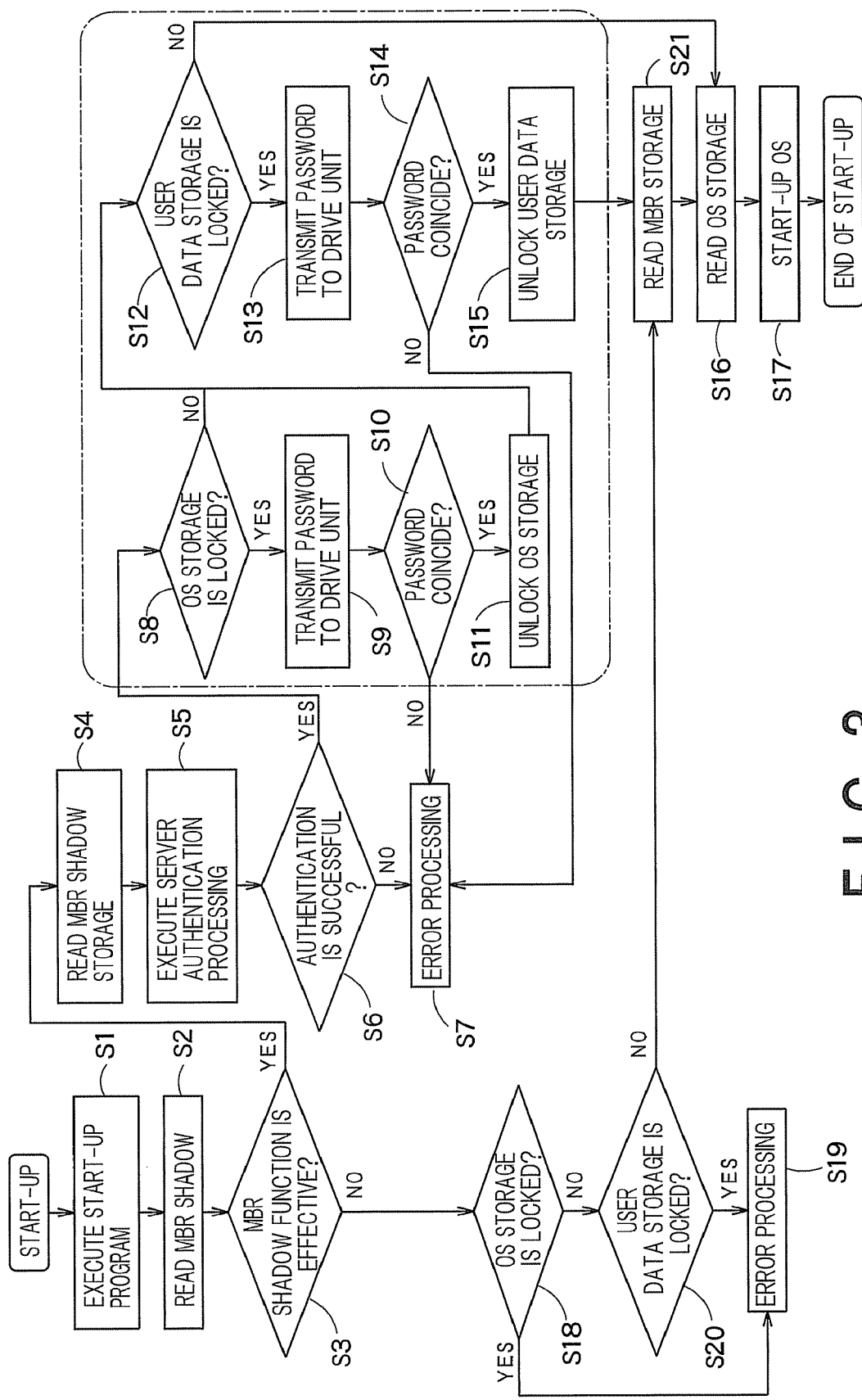
FIG. 3 is a flowchart showing the processing of the program stored in the MBR shadow storage 35.

Next, processing of the program stored in the MBR shadow storage 35 will be described below. FIG. 3 is a flowchart showing the processing of the shadow program stored in the MBR storage 35. First, the processing unit begins execution of the start-up program stored in the start-up processing unit 12 (step S1).

The processor accesses a predetermined area of the drive unit 4, for example, LBA0 address, i.e. the address for storing the MBR program, and reads out data corresponding to the address (step S2). When the drive unit 4 receives the read instruction at LBA0 address, the drive unit 4 checks the setting of the MBR shadow setting unit in order to determine whether the MBR shadow function is effective (step S3). The step S3 corresponds to a shadow determination unit. When the MBR shadow function is effective, instead of the boot program (MBR) stored in the MBR storage 8 in the data recording unit 6, the shadow program stored in the MBR shadow storage 35 is read out and transmitted to the host unit 5 to store it in the start-up processing unit 12 (step S4). The step S4 corresponds to a shadow reading unit.

Here, it is assumed that read and write operations for the OS storage 9 and the user data storage 10 in the drive unit 4 are locked. That is, it is assumed that the host authentication unit 32 is in a state that authentication with the host unit 5 is incomplete, and the OS storage 9 and the user data storage 10 are locked by the setting of the lock controller 33.

Next, the host unit 5 executes the shadow program, and the server authentication processing unit 23 performs authentication with the service authentication server 1 (step S5). The step S5 corresponds to a shadow execution unit.

Here, as the authentication in step S5, i.e. a server authentication, there are three concrete authentications as follows.

1) The data recording apparatus 3 authenticates whether the service providing server is an expected communication partner.
2) The service providing server 1 authenticates whether the data recording apparatus 3 is an expected communication partner.
3) The service providing server 1 and the data recording apparatus 3 authenticates mutually.

A well-known manner like ISO/IEC 9798-3 or ISO/IEC 9798-2 can be used as the manner of the authentication.

When the authentication is performed using a public key, the following processing is necessary. In the case of the above 1), the data recording apparatus 3 has to keep the public key of the service providing server 1 or a certificate including the public key. In the case of the above 2), the data recording apparatus 3 has to keep the private key. In the case of the above 3), the data recording apparatus 3 has to keep the public key of the service providing server 3, or both of the certificate including the public key and the private key. Data necessary for the authentication has to be stored in the MBR shadow storage 35 in advance.

Next, it is determined whether the authentication with the service providing server 1 is successful (step S6). If the authentication is unsuccessful, an error processing is performed (step S7). If the authentication is successful, the host authentication processing is performed (step S8 to S15).

The host authentication processing firstly determines whether the OS storage 9 is locked (step S8). If the OS is locked, the host unit 5 transmits a password to the drive unit 4 (step S9). Here, the password is data used for lock and unlock of the drive unit 4. The password is preliminarily registered to the host authentication unit 32 in the host unit 4. The manner of registering the password to the host authentication unit 32 may be, for example, the manner of embedding the password in the host authentication unit 32, the manner of setting an arbitrary value by a user using a program operated on the processing unit in the host unit 5, the manner of setting a value distributed from a server via a network using a program operated on the processing unit in the host unit 5, or the like. The password used for releasing the drive unit 4 by the host unit 5 may be preliminarily, for example, included in the shadow program, or stored in an arbitrary area in the host unit 5 such as a flash memory to read out the area by the shadow program.

Next, it is determined whether the password transmitted from the host unit 5 coincides with the password preliminarily registered to the host authentication unit 32 (step S10). If not coincide, the error processing is performed (step S7). If coincide, the lock release instruction is transmitted to the lock controller 33, thereby the OS storage 9 being unlocked (step S11).

Next, it is determined whether the user data storage 10 is locked (step S12). If locked, the password is transmitted from the host unit 5 to the drive unit 4 (step S13).

Next, it is determined whether the password transmitted from the host unit 5 coincides with the password preliminarily registered to the host authentication unit 32 (step S14). If not coincide, the error processing is performed (step S7). If coincide, the lock release instruction is transmitted to the lock controller 33, thereby the user data storage 10 being unlocked (step S15).

The above steps S9 and S13 correspond to a password transmitter, and steps S10 and S14 correspond to a password verification unit.

Here, the password for determining whether the OS storage 9 is unlocked and the password for determining whether the user data storage 10 is unlocked are registered to the host unit 5 separately from each other. These passwords may be registered together and then the processes of steps S8 to S15 may be performed in sequence. Or the register of the password and the unlock control for the OS storage 9 may be performed and then the register of the password and the unlock control for the user data storage 10 may be performed.

When determined in step S10 that the user data storage 10 is not locked, or when determined that the process in step S15 is ended, the processor reads the OS from the OS storage 9 (step S16) and starts up the OS (step S17), thereby the start-up process being ended.

The password transmitted from the host unit 5 to the drive unit 4 may be distributed from the service providing server 1 only when the authentication with the service providing server 1 is successful, instead of embedding the password in the above described shadow program. When the password is distributed from the service providing server 1, it is preferable to protect and transmit the password with a measure such as an encryption so that the password is not leaked between the service providing server 1 and the data recording apparatus 3.

Furthermore, when the drive unit 4 has multiple OS storages 9, the different passwords may be set for each of the locked areas and the service providing server 1 may switch the OSs to be unlocked. More specifically, the first OS storage and the second OS storage are set as areas different to each other, and both OS storages are set to be in lock state at start-up timing. When the authentication with the first service providing server 1 is successful, the password for the first OS storage 9 is used to release lock of the first OS storage 9, but the lock of the second OS storage 9 is not released. Therefore, the OS for the first service providing server 1 can be executed.

As described above, each area in the drive unit 4 is locked before the data recording apparatus 3 is started up. If the side of providing the service is unsuccessful to the authentication with the data recording apparatus 3, data recorded in the data recording apparatus 3 is not published outside. Therefore, the service providing server 1 can secure the areas for storing data to outside.

In the flowchart in FIG. 3, the unlock control of the OS storage 9 is performed and then the unlock control of the user data storage 10 is performed. The order of the unlock control is not limited. The lock and unlock control of the OS storage 9 may be omitted. That is, without locking the OS storage 9, only the user data storage 10 may be locked, and when a predetermined condition such as the authentication with the server 1 and the password verification is satisfied, the user data storage 10 may be unlocked.

When the authentication with the service providing server 1 is performed, the shadow program may check whether the platform coincides with the state assumed in advance. Here, the platform indicates, for example, a MAC address, an ID of the CPU, a serial ID of the OS, or the like. It may be checked whether these information is an expected value. Therefore, even if the drive unit 4 is physically removed from the other data recording apparatus 3 and attached to the other data recording apparatus 3, it is possible to detect the removal of the drive unit 4 because the MAC address of the data recording apparatus, the ID of the CPU and the serial ID of the OS are different by each apparatus, respectively. That is, the service providing server 1 can construct a system so that only a specific data recording apparatus 3 can be started up.

Furthermore, if the user data storage 10 in the drive unit 4 allocates a partition different from each of multiple users, it is possible to change a library used by the OS or the application stored in the user data storage 10 by switching the area in the user data storage 10 that the shadow program unlocks by the service providing server 1 or a result of the authentication with the service providing server 1.

For example, when the authentication with the service providing server 1 is successful, the shadow program may set so that the area storing a library A is unlocked, and when the authentication is unsuccessful, the shadow program may set so that the area storing a library B is unlocked. The OS uses the unlocked area. This is especially useful when there is a request that the service provider want to hide the program executed by the data recording apparatus 3. A typical example is a library used for a software (DRM software) calling for copyright protection such as a movie or a moving picture content. Generally, software for copyright protection needs to hide a key and an algorism for decrypting the encrypted contents in the software. However, the manner of hiding the confidential information in the software library is vulnerable to analysis. According to the present embodiment, as long as the authentication with the service providing server 1 is not successful, the area storing the library keeps the lock state by the password such as a PIN code. Therefore, it is impossible to remove the library stored in the locked area.

According to the present embodiment, it is possible to check the platform when the authentication with the service providing server 1 is performed. When determined to be an illegitimate platform, it is possible to suspend the unlock process.

As described above, according to the present embodiment, even if the library is implemented by software, the illegitimate platform cannot release the lock, thereby preventing illegitimate acquisition and analysis of the library.

In view of user, the present embodiment is useful when there is a request of publishing data to only a legitimate service provider. For example, it is assumed that private data such as a picture is recorded in the user data storage 10 and the data is published so that only the legitimate service provider can access the user data storage 10 by the service of the server run by the service provider. At this time, as long as the authentication with the service providing server 1 is not successful, the user data storage 10 storing the private data is kept in the state locked by the PIN code and is not unlocked. Therefore, it is impossible to take out the private data stored in the locked area.

There is the conventional manner in which all or a part of the data recording unit 6 is released by directly inputting the password from the keyboard. On the other hand, the conventional manner is different from the present embodiment in that after the authentication with the server successes, the password included in the MBR shadow storage 35 or the password given from the service providing server 1 by the network processing unit 22 are used in the present embodiment. Only when the authentication with the service providing server 1 is successful, it is possible to dynamically select the lock of which area is released.

A first characteristic feature of the present embodiment is to perform the authentication processing with the server 1 and the unlock process of the data recording unit 6 by using the shadow program stored in the MBR shadow storage 35 prior to the execution of the program in the MBR storage 8 and the OS. Generally, there are various counter measures against attacks in an application level which modifies the processing of the OS and changes the operation of the application by inserting an illegitimate program after the OS is started up and inserting illegitimate process in the memory. Since the present embodiment performs the authentication processing with the server 1 and the lock control of the data recording unit 6 prior to the start-up of the MBR and the OS, it is possible to more safely protect information stored in the data recording unit 6.

In order to modify the shadow program stored in the MBR shadow storage 35, it is necessary to access data stored in the flash memory etc. built in the drive unit 4. Since it becomes difficult for the attacker to attack the shadow program, a risk that the shadow program is illegitimate modified is low. Therefore, it is possible to improve a security level.

Furthermore, the drive unit 4 in the data recording apparatus 3 and the host unit 5 are generally supplied from different vendors. Since the conventional drive unit 4 did not have the MBR shadow storage 35 and the access controller 7, there was no another option besides an option that the host unit 5 is provided with the function which is equivalent with the MBR shadow storage 35. In this case, even if only the drive unit 4 is removed and the removed drive unit 4 are built in another data recording apparatus 4 to start up the drive unit 4, as long as the host unit 5 in this another data recording apparatus 4 does not have the function corresponding to the MBR shadow storage 35, the above security protection is impossible. Furthermore, even if the host unit 5 in this another data recording apparatus 3 has the function corresponding to the MBR shadow storage 35, it is necessary to install the shadow program in the host unit 5. The install work is complicated and usability is not good.

In the present embodiment, the MBR shadow storage 35 is provided in the drive unit 4 independent from the host unit 5. Therefore, even if the drive unit 4 is removed and installed to another data recording apparatus 3, the drive unit 4 is provided with the shadow program, and therefore there is no need that the host unit 5 has the function which is equivalent with the MBR shadow storage 35. It is possible to considerably easily realize that this another data recording apparatus 3 can ongoingly use the same shadow program as that in the original data recording apparatus 3

The data recording apparatus 3 of the present embodiment has the following advantage for an assembly maker who produces and sells an equipment such as a PC that the data recording apparatus 3 is built in. The assembly maker of the PC purchases the drive unit 4 such as a HDD from the other company and sells it by incorporating in the PC. The lock and unlock of the data recording apparatus 6 is not standardized. If there is no MBR shadow function, it is necessary to install the program for controlling the lock and unlock of the data recording unit 6 in the host unit 5 according to the type of the HDD to be built in.

On the other hand, when there is the MBR shadow function, since the program for locking or unlocking the data recording unit 6 is installed in the MBR shadow storage 35, if a proper shadow program is installed in the MBR shadow storage 35 at a maker side of the HDD before selling it, the PC maker can use the shadow program installed in the HDD. Therefore, the shadow program can be easily built in the PC regardless of the maker of the HDD, thereby reducing a production cost of the equipment.

The data recording apparatus 3 of the present embodiment has the following advantage even for user side. For example, even if the drive unit 4 is removed from the equipment built in the data recording apparatus 3 (such as a PC or a recorder) and built in another equipment, since the drive unit 4 has the MBR shadow function, it is possible to perform the lock and unlock control of the data recording unit 6 without modifying the host unit 5.

As described above, in the first embodiment, the MBR shadow program is started up prior to the start-up of the MBR or OS, and the server authentication is performed in the shadow program. When the server authentication is successful, the password registered in the shadow program and the password preliminarily registered in the host authentication unit 32 are verified. When the verification is successful, since the OS storage 9 and the user data storage 10 are unlocked by using the password, it is possible to more safely protect the information in the data recording unit 6.

Second Embodiment

In the first embodiment, the password for releasing the lock of the data recording apparatus 6 is stored in the shadow program stored in the MBR shadow storage 35. On the other hand, the host unit 5 of the second embodiment stores the shadow program in a private information storage.

FIG. 4 is a block diagram showing one example of internal configuration of a data recording apparatus according to the second embodiment. FIG. 4 is different from FIG. 2 in that the host unit 5 is provided with the confidential information storage 15. The host unit 5 has a processing unit 26 and a main memory 27, which are omitted in FIG. 2.

Figure 5:
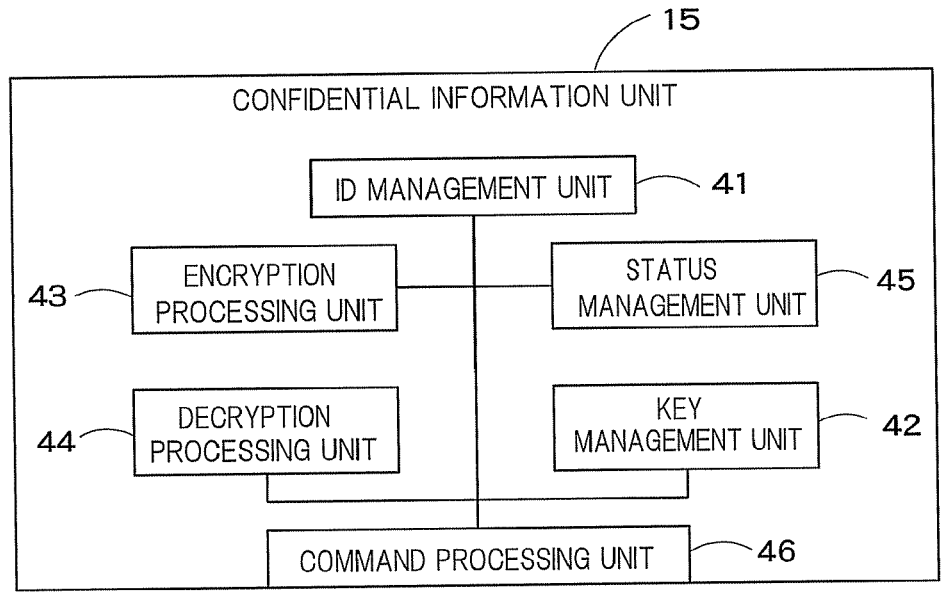
FIG. 5 is a block diagram showing one example of the confidential information storage 15.

FIG. 5 is a block diagram showing one example of internal configuration of the confidential information storage 15. The confidential information storage 15 in FIG. 5 has an ID management unit 41, a key management unit 42, an encryption processing unit 43, a decryption processing unit 44, a status management unit 45, and a command processing unit 46.

The ID management unit 41 stores an ID unique to the confidential information storage 15. Preferably, the ID is protected and stored so as not to be able to be modified from a value set at a time of a factory shipment or an initially set value.

The key management unit 42 has a function of generating a key in the confidential information storage 15 and a function of storing the generated key based on commands from the host unit 5. Since the confidential information storage 15 does not have any interface for outputting a value of the private key to outside, there is no likelihood that the value of the private key leaks out to outside of the confidential information storage 15.

The status management unit 45 has a register not shown for storing data. The register can be reset at only start-up timing, i.e. when the power is turned on, and the initial value at the reset timing is a preset fixed value such as 0. The status management unit 45 updates the value of the register based on the following Formula (1).

$$\text{NewValue} = \text{hash}(\text{Input} \| \text{OriginalValue}) \quad (1)$$

Here, "$\|$" is a sign for concatenating data, "hash" expresses a hash function such as SHA family (SHA1 or SHA256 etc.) or MD5. Formula (1) expresses that data (OriginalValue) originally stored in the register and input data (Input) are concatenated as the input of the hash function, and the output of the hash function is stored as a new value of the register. The register does not have any interface for setting an arbitrary value from outside.

That is, the register does not have an interface for setting the input value by itself as a value of the register, like "NewValue=Input".

The status management unit 45 may have multiple registers to inside thereof. In this case, as shown in the following Formula (2), a register number "Register #" may be provided to express a value of which register should be updated.

$$\text{NewValue} = \text{hash}(\text{Register \#} \cdot \text{Input} \| \text{OriginalValue}) \quad (2)$$

The status management unit uses a value of the register corresponding to "Register #", and updates a value of the register corresponding to "Register #" based on Formula (1).

An input value (Input) of an encryption target and a register value (RegisterValue) are inputted to the encryption processing unit 43. The encryption processing unit 43 outputs a value encrypted by the private key possessed by the key management unit 42. More specifically, data inputted based on the following Formula (3) is encrypted.

$$\text{Output} = \text{Encrypt}(\text{Input}, \text{RegisterValue}, \text{Key}) \quad (3)$$

Here, the function "Encrypt" is an encrypted function using a common key well-known as AES, DES or the like. A value of a first parameter of the function is encrypted by using a second parameter (RegisterValue) and a third parameter (Key) as a key, and the encrypted value is outputted as the output of the function. The manner using the second and third parameters as the key may be the manner of concatenating the second and third parameters, the manner of using as a key a value obtained by encrypting the second parameter by the third parameter with a function such as AES, or the like.

When data is encrypted by using the encryption processing unit, the host unit 5 gives two parameters "Input" and "Register" to the command processing unit 46 in the confidential information storage 15. When there is only one register, "Register #" is unnecessary.

"Input" in Formula (3) is plaintext data of the encryption target, and "Register #" is a register number of the status management unit 45. That is, "RegisterValue" is a current value of a register corresponding to the register number designated by "Register #". That is, the encryption processing unit 43 encrypts the input data by using two values of the private key possessed by the key management unit 42 and the register in the status management unit 45. Therefore, the input data is bound to both of registers of the key management unit 42 and the status management unit 45. Here, the input data is a password generated by the shadow program as described below, and the encryption processing unit 43 generates the encrypted password based on Formula (3).

An input value of the decryption target and a value "RegisterValue" of the register are inputted to the decryption processing unit 44. The decryption processing unit 44 outputs a value obtained by decrypting the input value "Input" by a value "Key" of the private key possessed by the key management unit 42. More specifically, the input value is decrypted based on the following Formula (4).

$$\text{Output} = \text{Decrypt}(\text{Input}, \text{RegisterValue}, \text{Key}) \quad (4)$$

Here, "Decrypt" is a decryption function corresponding to the encryption function used for the encryption. The decryption function decrypts a value of a first parameter by using second and third parameters as a key, and the decrypted value is outputted from the output "Output" of the function. The input value of the decryption processing unit 44 is an encrypted password, and the password before being encrypted is restored by Formula (4).

When the decryption processing unit 44 decrypts data, i.e. decrypted password, the host unit 5 gives two parameters "Input" and "Register #" to the command processing unit 46 in the confidential information storage 15 as well as the encryption process. When there is only one register, "Register #" is unnecessary.

As described above, "Input" of Formula (4) is an encrypted password of the decryption target, and "Register #" is a number of the register possessed by the status management unit 45. "RegisterValue" is a current value of a register corresponding to a register number designated by "Register #". That is, the encrypted password is decrypted by using two values of the private key of the key management unit 42 and the register in the status management unit 45.

Figure 6:
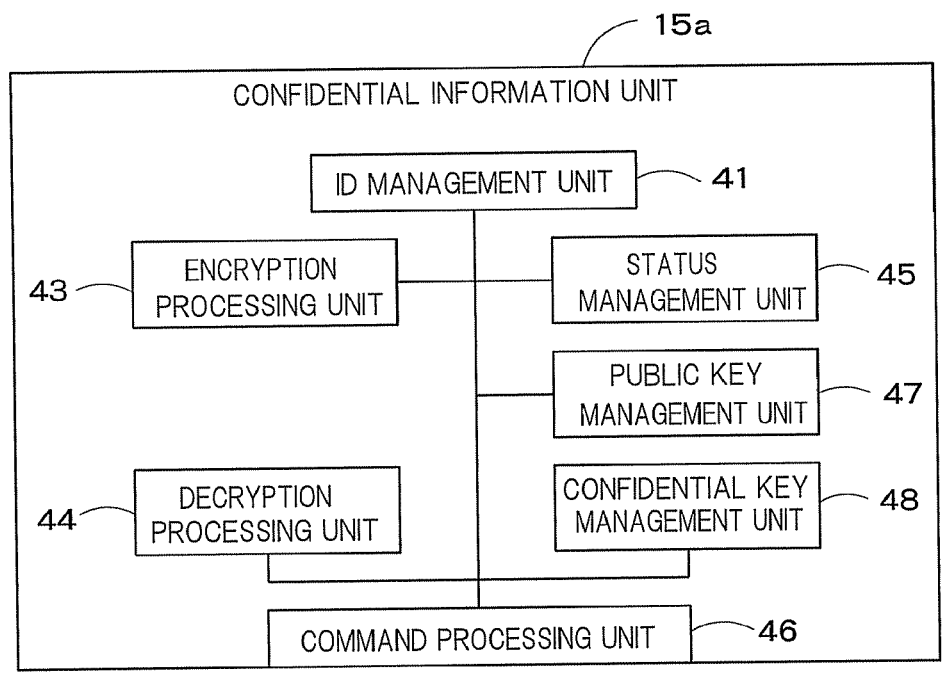
FIG. 6 is a drawing showing one example of the confidential information storage 15a using the public key.

The above description shows an example of performing encryption using a common key in the encryption processing unit 43. Instead of using the common key, the public key may be used. FIG. 6 is a drawing showing one example of internal configuration of the confidential information storage 15*a* in the case of using the public key. FIG. 6 is different from FIG. 5 in that a public key management unit 47 are provided and a private key management unit 48 are provided instead of the key management unit 42 in FIG. 5.

The public key management unit 47 has a pair of the public keys. The public key management unit 47 has a function of decrypting the encrypted data by using the private key stored in the public key management unit 47 and generating a signature for data based on commands from the host unit 5. A well-known manner such as RSA may be adopted as a concrete manner of using the public key.

The private key management unit 48 has a function of generating the private key and the common key in the confidential information storage 15*a* and a function of storing the generated private key based on commands from the host unit 5.

The confidential information storage 15*a* in the case of using the public key has an interface for outputting the public key to outside. The public key information may be able to be referred from the shadow program or the other program executed by the data recording apparatus 3.

The public key may contain a signature generated using the private key of a vendor who produces the confidential information storage 15*a*, a producer who implements the data recording apparatus 3, or an organization who manages the private information management unit in a certain technical field.

When the input value "Input" is encrypted using the public key, the "Key" in the encryption function may be replaced with the public key possessed by the key management unit 42. When the input value is encrypted, since the public key is used, the encryption process does not necessarily need to be executed by the confidential information storage 15a. The confidential information storage 15a does not need to have the encryption processing unit 43. When the confidential information storage 15a does not perform the encryption process of the input value, the program operated by the host unit 5, i.e. the shadow program etc., may perform the encryption processing. Similarly, when the decryption process is performed, the "Key" in the decryption function "Decryption" may be replaced with the private key possessed by the key management unit 42.

Hereinafter, as long as there is no particular reference, an example of using the common key will be described.

Data inputted to the status management unit 45, i.e. "Input" of the hash function, is a confidential value known by only a program which issues commands for the encryption or decryption processing, thereby protecting "Input" data. The confidential value may be a value of the key known by only a program for command transmission or arbitrary data in the memory.

When the processor 26 executes the program, the program is extracted on a main memory 27. For example, when the program executes a specific instruction, a value at a certain location or a certain range "A" in the main memory 27, for example, data "A" in the main memory 27 when step X is executed, may be set as a value of "Input". Therefore, it is possible to encrypt or decrypt data only when a certain program is in a certain status. By applying this to another case, when a certain program executes steps A and B in order, data in the main memory 27 may be set as a value of "Input". Therefore, if a malicious person modifies the program, it becomes impossible to input a correct "Input" to "Decrypt" function, thereby improving security.

Or data which combines data in the main memory 27 when a certain program executes step C with data in the main memory 27 when the program executes step D may be stored in the register in the status management unit 45. In this case, when step C is skipped or step D is executed prior to step C, a value stored in the register in the status management unit 45 changes. Therefore, correct encryption and decryption become impossible, thereby preventing illegitimate modification of the program.

As described above, the second embodiment is different from the first embodiment in that when the password used for the authentication with the drive unit 4 is stored, the confidential information storage 15 or 15a are utilized in the second embodiment.

A technical feature of the processing of the second embodiment is to have a password setting phase for protecting the password and storing it in the confidential information storage 15 and an unlock phase for unlocking the drive unit 4 using the set password.

FIG. 7 is a flowchart showing one example of the processing of the password setting phase performed by the shadow program. Hereinafter, as long as there is no particular description, the MBR shadow function is assumed to be effective.

In the password setting phase of FIG. 7, the processor 26 firstly executes a start-up program (step S31). In the program, the shadow program is read (step S32).

A value of the register in the status management unit 45 is reset when power is turned on. The shadow program is executed before the OS is started up. A value of the register in the status management unit 45 is assured to be an initial value. The shadow program generates the password by software containing a random number generator not shown, or when the confidential information storage 15 has the random number generator, the generator may be used to generate the random number. This step S33 corresponds to a password generator.

The shadow program transmits the password generated by step S33 to the host authentication unit 32 in the drive unit 4 in order to use the password for verification of whether the drive unit 4 should be unlocked (step S34). The host authentication unit 32 registers the transmitted password (step S35).

Next, every time the processor 26 executes a specific instruction in the shadow program (step S36), a value at a specific location or area is registered to the register in the status management unit 45 (step S37). Therefore, a value of the register in the status management unit 45 is updated (step S38).

The shadow program updates the value of the register in the status management unit 45 one or more, and then transmits a plaintext password not encrypted to the confidential information storage 15 (step S39). The encryption processing unit 43 performs the encryption process by using the private key stored in the key management unit 42 of the confidential information storage 15 and the value of the register in the status management unit 45 (step S40). For example, the encryption process is performed based on Formula (3).

When the encryption is performed using the public key, the encryption processing unit 43 or the shadow program performs the encryption process by using the public key corresponding to the private key stored in the key management unit 42. The encrypted password may be stored in a non-volatile memory in the host unit 5 or the data recording unit 6 which is unlocked in the drive unit 4.

Next, the shadow program transmits the lock instruction in the drive unit 4 (step S41). The lock controller 33 locks the data recording unit 6 in response to the lock instruction (step S42). After then the data recording unit 6 becomes lock state as long as the registered password is not transmitted.

The password setting phase in FIG. 7 is performed by being divided into a password setting phase for the OS storage 9 and a password setting phase for the user data storage 10. Two types of the encrypted passwords are generated by successively performing the two password setting phases, and then the OS storage 9 and the user data storage 10 may be locked. Or one of the two password setting phases, for example, the password setting phase for the OS storage 9, may be performed to lock the OS storage 9, and then the other password setting phase may be performed to lock the user data storage 10.

Next, the unlock phase will be described below. Even in the unlock phase, an unlock phase of the OS storage 9 and an unlock phase of the user data storage 10 will be performed separately. Hereinafter, either of them will be described below.

Figure 8:
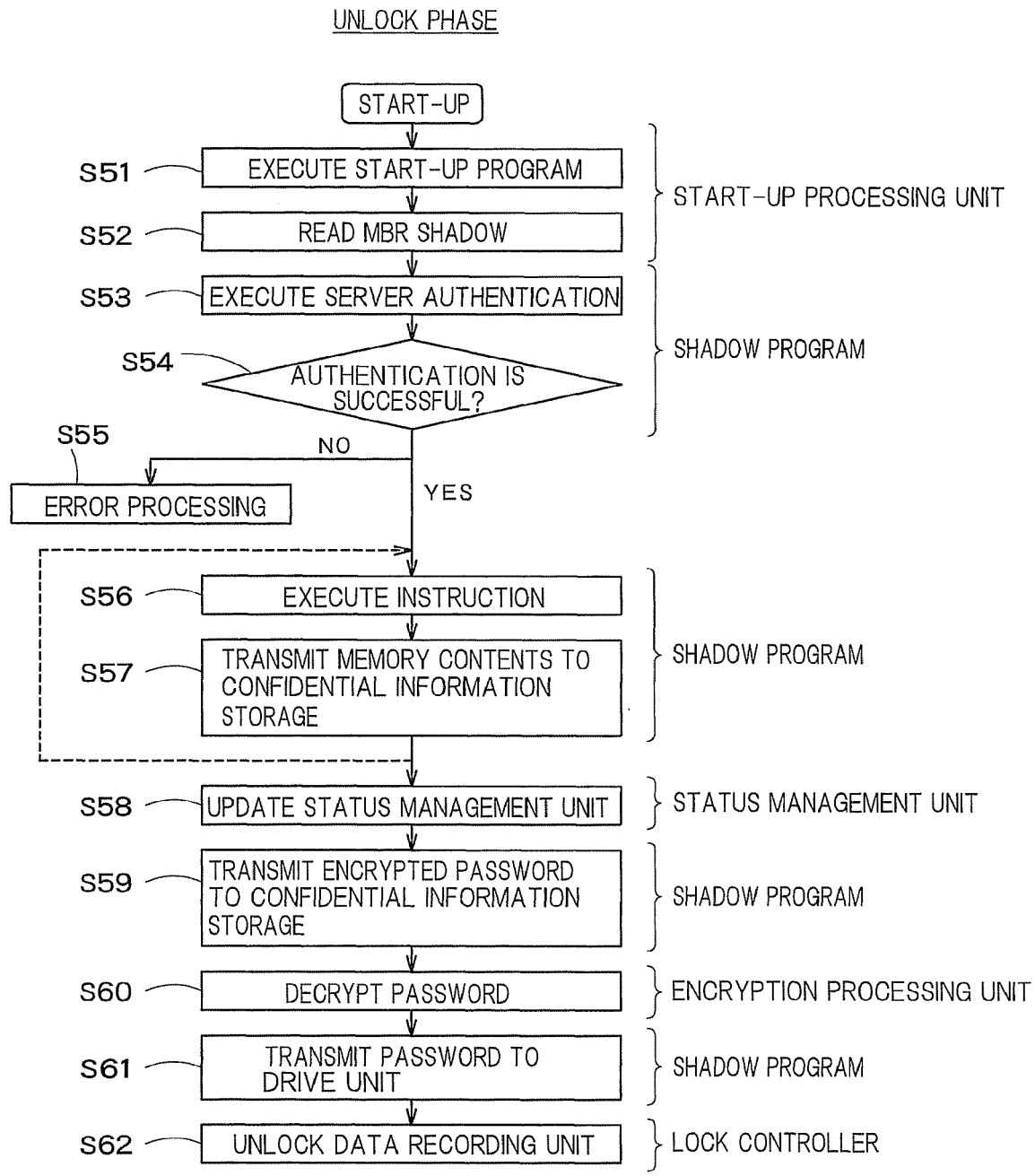
FIG. 8 is a flowchart showing one example of the processing of the unlock phase.

FIG. 8 is a flowchart showing one example of the processing of the unlock phase performed by the shadow program. The processing before the start-up program reads the shadow program is the same as the first embodiment (step S51, S52).

In the unlock phase, the shadow program performs the server authentication (step S53). It is determined whether the server authentication is successful (step S54). When the server authentication is not successful, the error processing is performed (step S55).

When the server authentication is successful, the processing for setting the same value as a value of the status management unit 45 set by the password setting phase, i.e. the same processing as steps S36 to S37, is performed to update a value of the status management unit 45 (step S58). At this time, if the shadow program is a proper one, the value of the register in the status management unit 45 when the password is encrypted coincides with the value of the current register. Accordingly, the encrypted password is transmitted to the confidential information storage 15 (step S59), and the encrypted password can be decrypted by the decryption processing unit 44 in the confidential information storage 15 (step S60). The decrypted password coincides with the original password corresponding to the encrypted password in FIG. 7 when the shadow program is a proper one.

The shadow program transmits the decrypted password to the drive unit 4 (step S61). The host authentication unit 33 in the drive unit 4 validates the transmitted password with the preliminarily registered password. If the validation is successful, the lock controller 33 unlocks the data recording unit 6 (step S62).

Since the above flowchart shows one example in which the shadow program generates the password for unlock, the shadow program may communicate with the server 1 on internet 2 and acquire the password via internet through the server 1. In this case, it is necessary to protect and transmit the password so that the password transmitted from the server 1 is not peeped from another person through a communication path between the server 1 and the data recording apparatus 3. As a method of realizing this, a public key encryption using the public key of the data recording apparatus may be used.

As described above, when the key management unit 42 uses the public key, the key management unit 42 has a pair of the public keys, to decrypt data by using the private key stored in the key management unit 42 and to generate the signature for data.

Figure 9:
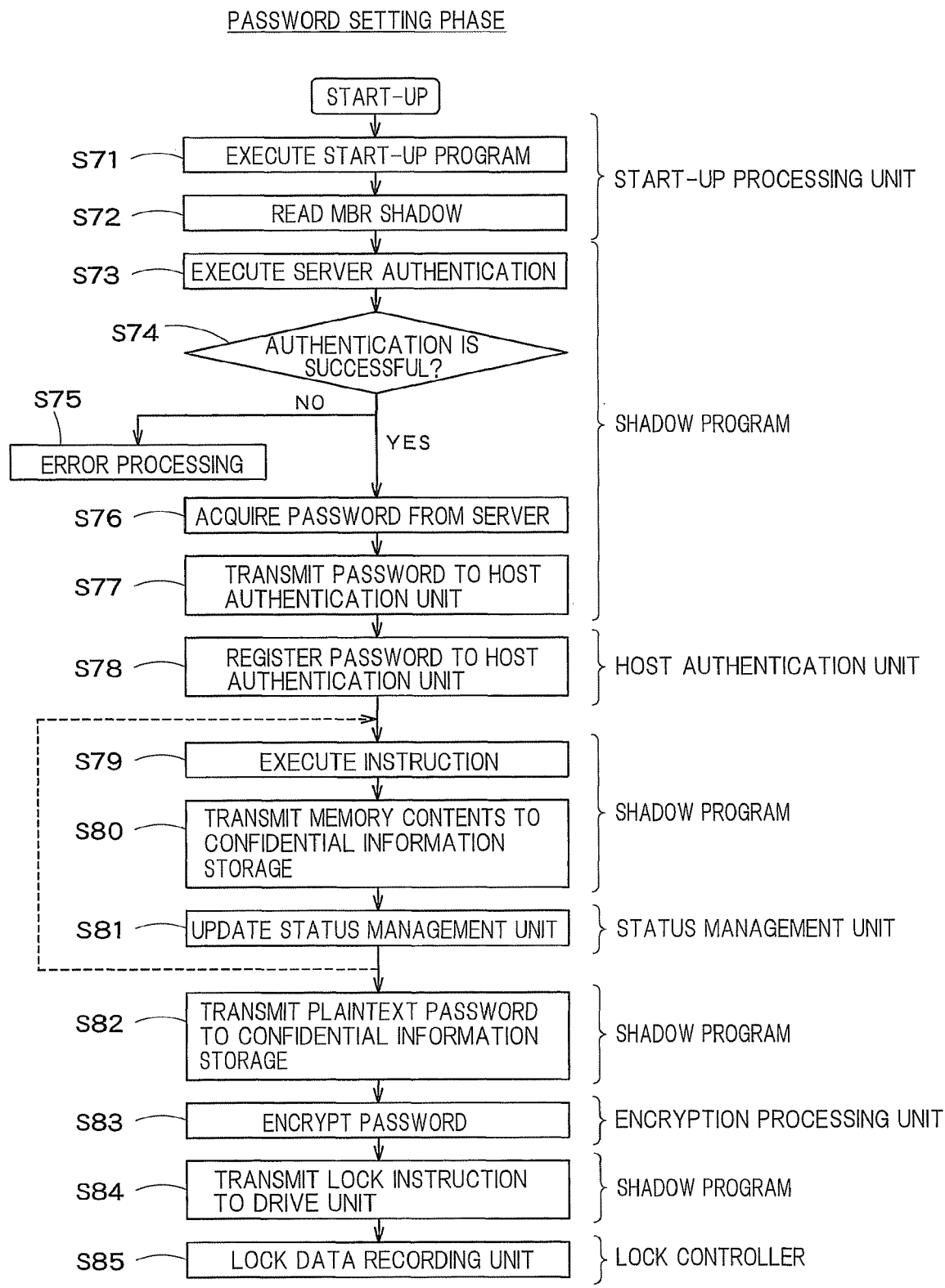
FIG. 9 is a flowchart showing one example of the processing of the shadow program when the password is acquired from the server 1.

FIG. 9 is a flowchart showing one example of the processing of the shadow program when the password is acquired from the server 1. The processing before the start-up program reads the shadow program (step S71 and S72) is the same as the processing in FIG. 7. After that, FIG. 9 executes the server authentication (step S73). The authentication processing is a client authentication processing that the server 1 authenticates the data recording apparatus 3. It is determined whether the authentication is successful by verifying the signature of the certificate (step S74). When the server 1 determines that the data recording apparatus 3 does not have a proper certificate, the shadow program determines that the authentication is a failure and performs the error processing (step S75).

On the other hand, when the server 1 can determine that the data recording apparatus 3 has the proper certificate, the shadow program determines that the authentication is successful, and encrypts the password by using a value of the public key included in the certificate to transmit the encrypted password. On the other hand, when the authentication with the server 1 is not successful, the password is not transmitted.

When the encrypted password is received from the server 1, the shadow program decrypts the password and transmits the decrypted password to the host authentication unit 32 in the drive unit 4 (step S77). After that, the same processing as the processing in step S36 to S42 is performed and the data recording unit 6 is locked by the password (step S79 to S85).

The unlock process in the drive locked by the processing in FIG. 9 is performed by the unlock phase similar to FIG. 8.

Generally, it is preferable to change the value of the password by each of the data recording apparatuses 3. The reason is that when the password in one of the data recording apparatuses 3 leaks out, the other data recording apparatus 3 in which the same password is set can be unlocked as well. Therefore, it is necessary to set the password different from each of the data recording apparatuses 3 in the shadow program when the shadow program includes the value of the password.

On the other hand, when the server 1 issues and manages the password used for the unlock of the drive 4, it is unnecessary to include the value of the password in the shadow program.

When the shadow program sets the password different from each of the data recording apparatuses 3, multiple shadow programs each having a different password has to be generated, and each of the generated shadow programs has to be installed in the different data recording apparatus 3. When the server 1 issues the password, a common shadow program can be installed in all the data recording apparatuses. Therefore, the install work to the data recording apparatus 3 becomes easy, thereby reducing production cost. Since the same program can be distributed when the shadow program is updated, maintenance cost can also be reduced. Since the password is managed by the server 1, even when the MBR shadow storage 35 is out of order and the shadow program breaks down, or even when the shadow program crushes due to some kinds of causes, the password can be easily recovered and the shadow program can be quickly restored by transmitting the password managed by the server 1 to the data recording apparatus 3.

In the flowcharts in FIGS. 7 and 9, the register in the status management unit 45 stores the status of the main memory 27 after the specific instruction is executed to use the status as a part of the encrypted key of the password. Besides this, there are some variations.

Figure 11:
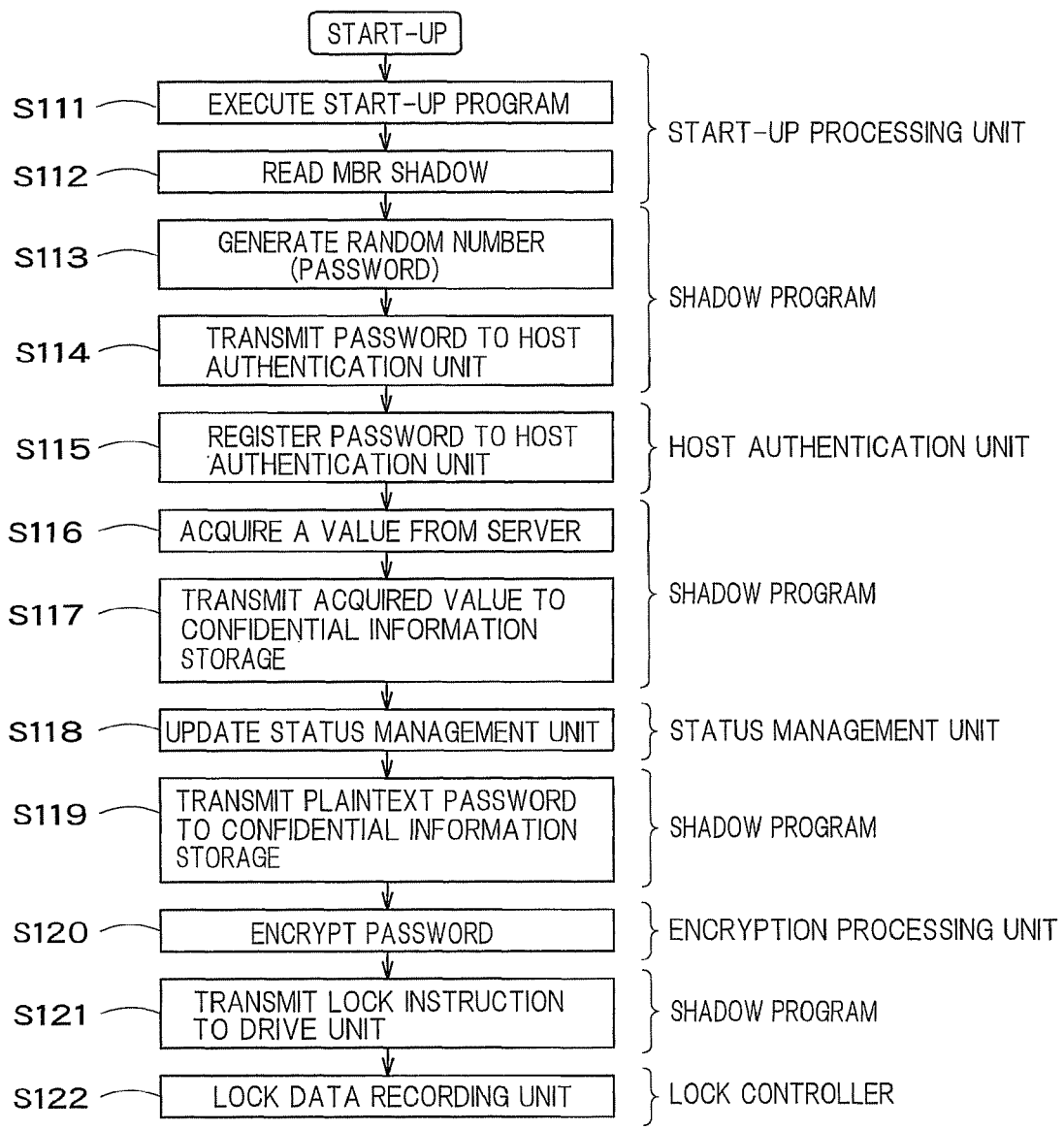

For example, FIGS. 10 and 11 are flowchart showing one example of the processing of the password setting phase stored in the MBR shadow storage 35. FIG. 10 shows the processing for acquiring the other value from the server 1 and stores the value of the register in the status management unit 45 to update the register in the status management unit 45 FIG. 11 shows the processing of generating the password by the same processing as the processing in FIG. 7, and storing the value acquired from the server 1 in the register in the status management unit 45 to update the register in the status management unit 45.

The processing of FIG. 10 acquires the password from the server 1 and registers the password to the host authentication unit 32 (step S97), and then acquires another value from the server 1 (step S99), and stores the acquired value in the register in the status management unit 45 to update the register (step S101).

The processing of FIG. 11 generates the password by using the shadow program and registers the password to the host authentication unit 32 (step S115), and then acquires a value from the server 1 (step S116), and stores the acquired value in the register in the status management unit 45 to update the register (step S118).

FIG. 12 is a flowchart showing an example of the processing of the unlock phase corresponding to a case of storing the value acquired from the server 1 in the register in the status management unit 45. This flowchart shows the processing of the unlock phase corresponding to the password setting phase in FIGS. 10 and 11.

The processing in FIG. 12 stores and executes the shadow program into the start-up processing unit 12 (steps S131 and S132), and then executes the server authentication (step S133). When the server authentication is successful, a value is acquired from the server 1 (step S136). The acquired value is transmitted to the confidential information storage 15 (step S137). The value is stored in the register in the status management unit 45 in the confidential information storage 15 to update the register in the status management unit 45 (step S138).

After that, the same processing as that of steps S59 to S62 in FIG. 8 is performed (steps S139 to S142). Therefore, the drive unit 4 is unlocked by using the decrypted password (step S109).

In the above first and second embodiments, an example including the password in the shadow program stored in the MBR shadow storage 35 has been described. The shadow program is originally intended to be executed first, and loaded to the start-up processing unit 12 and then executed. It is difficult to acquire the shadow program by itself as long as the start-up processing unit 12 is not modified. However, when the program is successfully analyzed by some manner, a value of the password for unlocking the drive unit 4 may also be analyzed.

On the other hand, the present embodiment has also explained the other example of encrypting the value of the password by using a value transmitted from the server 1 and the private key in the private key information storage 15 and storing the encrypted password. Even if the shadow program could be analyzed, it would be impossible to acquire the password. In order to decrypt the encrypted password transmitted from the server 1, the authentication with the server 1 has to be performed using a proper certificate and the private key in the confidential information storage 15. However, since the confidential information storage 15 does not have any interface for outputting the private key to outside of the confidential information storage 15, it is very difficult to illegitimately acquire the private key. Therefore, it is also very difficult to illegitimately acquire the password.

As described above, according to the second embodiment, the password for unlock is generated by the confidential information storage 15 in the host unit 5. Therefore, there is no likelihood that the password is illegitimately acquired. It is possible to perform unlock control of the data recording unit 6 more securely.

Third Embodiment

The first and second embodiments assume that the shadow program stored in the MBR shadow storage 35 is installed in the equipment by the equipment producer at shipping. On the other hand, the third embodiment has a feature in which the shadow program are divided into a part installed in the equipment before the equipment is shipped and a part to be downloaded from the server 1.

FIG. 13 is a block diagram showing schematic configuration of the data recording apparatus 3 according to the third embodiment. FIG. 13 is different from FIG. 4 in that the MBR shadow storage 35 has an initial install-storage 35a and a download-storage 35b, and the user data storage 10 in the data recording unit 6 is divided into multiple data areas 10a. The initial install-storage 35a is a processing unit storing a program preliminarily installed by the equipment producer at shipping.

As described in the first embodiment, the password can be set by each of lock areas in the user data storage 10. For example, it is assumed that private data such as user data that a user want to secretly hold in the data storage 3 is stored in a data area 1, setting data and management data regarding a service preferable to reject access to the first service providing server 1 until the authentication with the first service providing server 1 is completed is stored in a data area 2, and setting data and management data regarding a service preferable to reject access to the second service providing server 1 until the authentication with the second service providing server 1 is completed is stored in a data area 3.

First, the password setting phase will be described hereinafter. It is set that user data stored in the data area 1 should be published at which condition by the program stored in the initial install-storage 35a. This condition, for example, may be a condition of coinciding with a value of the ID stored in the ID management unit 41 in the confidential information storage 15, or a condition of being successful in the authentication with the server 1. As a measure of confirming whether to coincide with the ID in the ID management unit 41, a value of ID in the ID management unit 41 is set to the register in the status management unit 45, and the password is encrypted by using the encryption processing unit 43 at that state. When the program stored in the initial install-storage 35a is executed, the value of ID in the ID management unit 41 is set to the register in the program, and then the encrypted password is inputted to decrypt it by the decryption processing unit 44 and to verify whether the decrypted password coincides with the value set to the register. In this way, if the password is encrypted and stored preliminarily, when the program stored in the initial install-storage 35a is executed, it is impossible to correctly decrypt the password as long as the password does not coincide with the value of ID in the ID management unit 41 used for encryption, thereby inhibiting unlock of the data area 1.

By such processing, even if the drive unit 4 is removed from the original equipment and mounted to another equipment to start up it, the value of ID in the ID management unit 41 provided in another data recording apparatus 3 is different from the value of ID in the ID management unit 41 provided in the original data recording apparatus 3 in which the drive unit 4 has been installed. Therefore, even if the program stored in the initial install-storage 35a is executed, ID set to the register in the status management unit 45 is a different value, and therefore it is impossible to obtain a correct value even if the encrypted password is decrypted by the decryption processing unit 44 at that state. In this way, the drive unit 4 can be related to the data recording apparatus 3.

Similarly, the program stored in the download-storage 35b (hereinafter called as a download program) sets that data which is stored in the data area 2 and dealt with the server 1 should be published at which condition. This condition may be designated by user, or the condition may be preliminarily described in the download program and the server 1 may distribute the program to designate the condition by user. As the manner of instructing the download of the download program from the server 1, the download may be instructed by an instruction of the program stored in the initial install-storage 35a, or the application may download the download program after the OS is started up to store it in the download-storage 35b.

Next, the unlock phase will be described. FIG. 14 is a flowchart showing one example of the processing of the unlock phase performed by the shadow program. The processing in FIG. 14 is the same as that of FIG. 8 until the start-up program read the shadow program (step S151, S152). Next, among the shadow program, the program stored in the initial install-storage 35a is executed (step S153). In this program, the condition of whether the data area 1 may be unlocked is inspected (step S184).

It is determined whether to coincide with the condition (step S155). If not coincide with the condition, the error processing is performed (step S156), and the data area 1 is not unlocked. If coincide with the condition, the OS storage 9 is first unlocked (step S157), and then the data area 1 is unlocked (step S158).

Next, the program in the download-storage 35b included in the shadow program is executed (step S159). The program in the download-storage 35b performs the authentication processing with the server 1 (step S160).

Next, it is determined whether the server authentication is successful (step S161). The error processing is performed when the server authentication is not successful (step S156). When the server authentication is successful, the data area 2 is unlocked (step S162).

When the program stored in the initial install-storage 35a executes a last instruction, if the processing for storing a value on the main memory 27 in the resister in the status management unit 45 is performed, the program in the download-storage 35b confirms the value of the register in the status management unit 45 at this time. Therefore, it is possible to confirm whether the program stored in the initial install-storage 35a is surely executed. The processing of adding the confirmation processing is shown in FIG. 15.

FIG. 15 is the same as FIG. 14 in the processing until the data area 1 is unlocked (step S171 to S178). The program stored in the initial install-storage 35a gives a specific value on the main memory as an input every time the program stored in the initial install-storage 35a executes a specific step. Therefore, a value of the register in the status management unit 45 is updated (step S179 and S180).

When execution of the program stored in the initial install-storage 35a is completed, the program of the download-storage 35b is next executed (step S181). The program stored in the download-storage 35b confirms the current value in the status management unit 45 (step S182).

It is determined whether the current value of the status management unit 45 coincides with an expected value (step S183). If not coincide, the error processing is performed (step S176). If coincide, the program stored in the download-storage 35b performs the server authentication processing. If the authentication is successful, the data area 2 is unlocked (step S184 to S186).

If the program stored in the initial install-storage 35a has been modified on the purpose of illegitimately decrypting data, a value to be expected is not stored in the register in the status management unit 45. Therefore, the program stored in the download-storage 35b can check the value of the register in the status management unit 45, thereby confirming whether the program is illegal.

As a measure of checking whether the value of the status management unit 45 coincides with the expected value, besides a measure of directly comparing values in the status management unit 45, there is also a measure of using the encryption processing unit 43 and the decryption processing unit 44 in the confidential information storage 15. The program stored in the initial install-storage 35a and the program stored in the download-storage 35b agree with the same value in advance, and the program stored in the initial install-storage 35a encrypts the value by the encryption processing unit 43 in the confidential information storage 15. If the value in the status management unit coincides with the expected value and the program stored in the download-storage 35b decrypts the value encrypted by the decryption processing unit 44 in the confidential information storage 15, it is possible to obtain the preliminarily agreed value. Otherwise since the value of the register in the status management unit 45 is different, it is impossible to obtain the agreed value.

In this way, according to the third embodiment, the shadow program is divided into a part installed when the equipment is assembled and a part downloaded from the server 1, and areas in the user data storage 10 are divided. Therefore, it is possible to perform lock/unlock control different by each of data used by a local environment and data used by the server 1. At a stage of executing the program stored in the initial install-storage 35a, it is possible to check whether the program has been modified. If there is a suspicion of illegitimately use, it is possible to prohibit execution of the program stored in the download-storage 35b, thereby blocking the subsequent start-up of the OS and unlock of the user data storage 10.

Fourth Embodiment

In the above second and third embodiments, the shadow program stored in the MBR shadow storage 35 sets a specific value on the main memory 27 to the status management unit 45. The shadow program checks whether the program is correctly executed until the current time point by checking the current value in the status management unit 45, and decrypts the password of protection target by using the value in the status management unit 45. On the other hand, a fourth embodiment described hereinafter is different from the second and third embodiments in that the processor 26 executing the shadow program has a function of setting the specific value on the main memory 27 to the status management unit 45.

Figure 16:
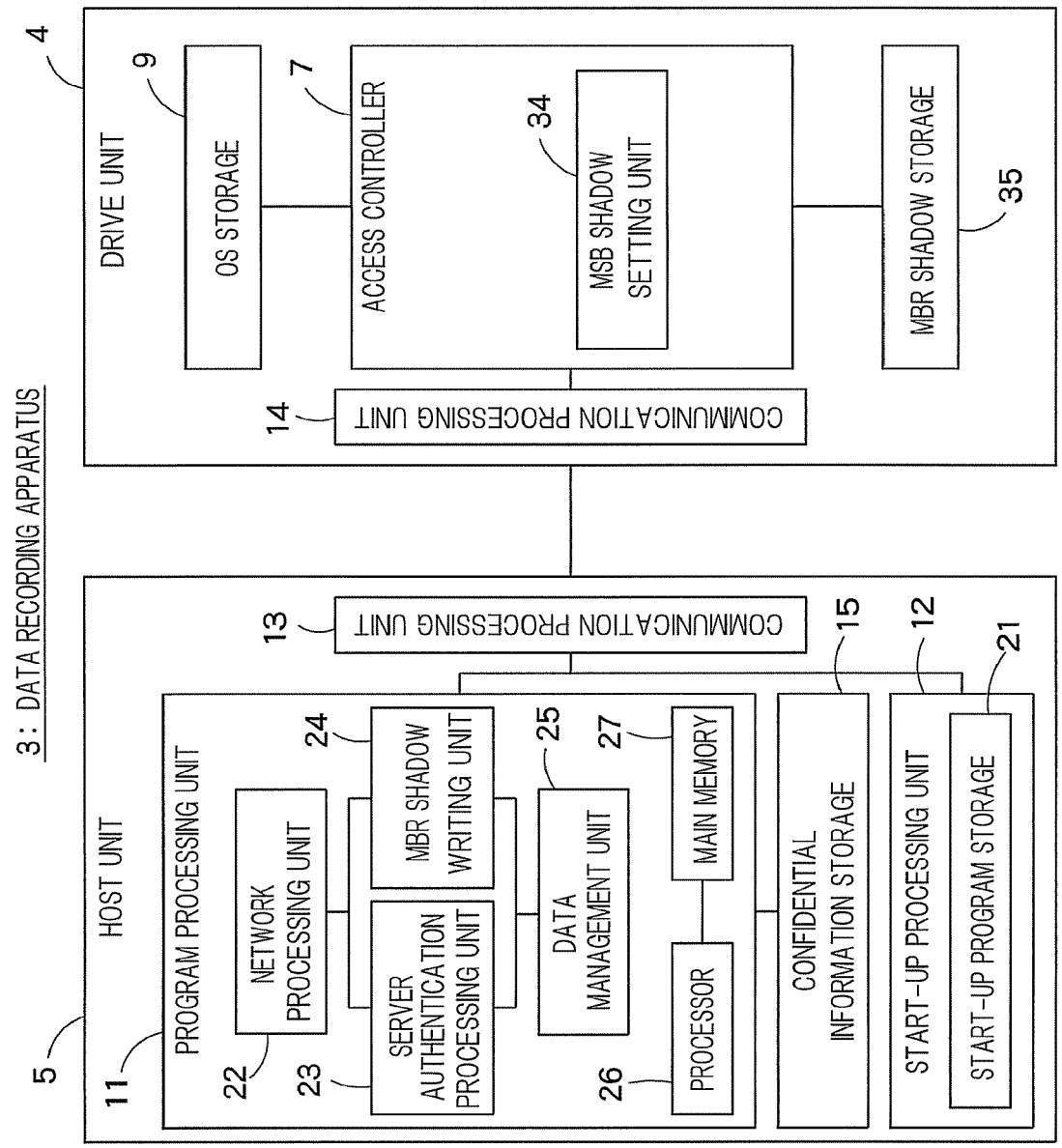
FIG. 16 is a block diagram showing schematic configuration of the data recording apparatus 3 of the fourth embodiment.

FIG. 16 is a block diagram showing schematic configuration of the data recording apparatus 3 according to the fourth embodiment. The processor 26a in the program processing unit 11 of FIG. 16 has a characteristic in which a special instruction X can be executed and an encryption data storage not shown is provided. In the data recording apparatus 3 according to the fourth embodiment, it is not necessarily inevitable to provide the user data storage 10 in the data recording unit 6. Therefore, the user data storage 10 is omitted from FIG. 16. Similarly, instead of starting up the OS via the MBR, the start-up processing unit 12 may directly read and start up the OS. Therefore, FIG. 16 also omits the MBR storage 8. In accordance with this, the request data range checking unit 31, the host authentication unit 32 and the lock controller 33 in access controller 7 are also omitted. Instead of omitting them, they may be kept.

FIG. 17 is a block diagram showing one example of internal configuration of the processor 26a capable of executing the special instruction X. The processor 26 according to the first, second and third embodiments may have a general instruction set. On the other hand, the processor 26a of the present embodiment can execute the special instruction X, and has the register necessary for the special instruction X. More specifically, the processor 26a of FIG. 17 has a general command processing unit 51, a special instruction processing unit 52, a main memory range designation register 53, an execution start address designation register 54 and a hash calculation processing unit 55.

The general command processing unit 51 is a processing unit for executing the general instructions. The main memory range designation register 53 is a register for designating a range of calculating the hash value on the main memory.

The hash calculation processing unit 55 calculates the hash value of data at the range designated by the main memory range designation register 53 on the main memory 27 when the special instruction X is issued.

The execution start address designation register 54 instructs the general command processing unit 51 of an instruction to be first executed as a final processing when the special instruction X is issued.

The special instruction processing unit 52 has a function in which the hash value in the main memory 27 is calculated at a range designated by the main memory range designation register 53 to set it to the processor status management unit 42 and the instruction stored in the address designated by the execution start address designation register 54 is executed by the general command processing unit 51. That is, after the processor 26a executes the special instruction X, the processing is continued from the instruction stored in the address designated by the execution start address designation register 54.

FIG. 18 is a block diagram showing one example of schematic configuration of the confidential information storage 15b according to the fourth embodiment. The confidential information storage 15b of FIG. 1B has a configuration which adds a processor status management unit 49 and a determination unit 50 to the confidential information storage 15 of FIG. 5.

The processor status management unit 49 has a register not shown and has a function of setting a designated value to the register.

The determination unit 50 performs control of setting the designated value to the register in the processor status management unit 49, only based on the instruction from the processor 26a. The status management unit 45 shown in FIGS. 5 and 6 could set the value designated without using the special instruction from the program to the register in the status management unit 45. On the other hand, the processor status management unit 49 is different in that the error is returned when a setting instruction is received without using the special instruction X from the program.

In addition to this, the encryption data storage may be provided to store the encrypted data. Since the encryption data storage is not inevitable, it is omitted in FIG. 1B.

In the fourth embodiment, prior to the processing for performing the authentication with the server 1, the processing for installing the private key for performing the authentication with the server 1 in the data recording apparatus 3 is performed. As the manner of generating the private key, there are the manner of using the public key and the manner of using the common key.

Figure 19A:
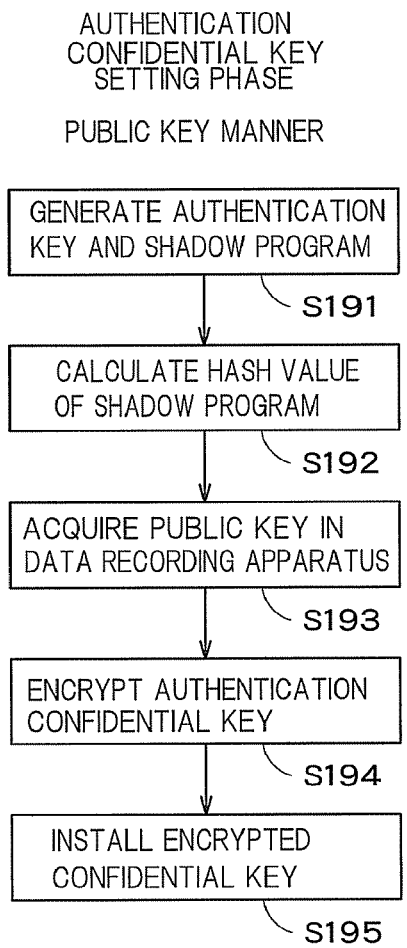
FIG. 19A is a flowchart showing one example of the phase for setting the authentication private key when the public key is used.
Figure 19B:
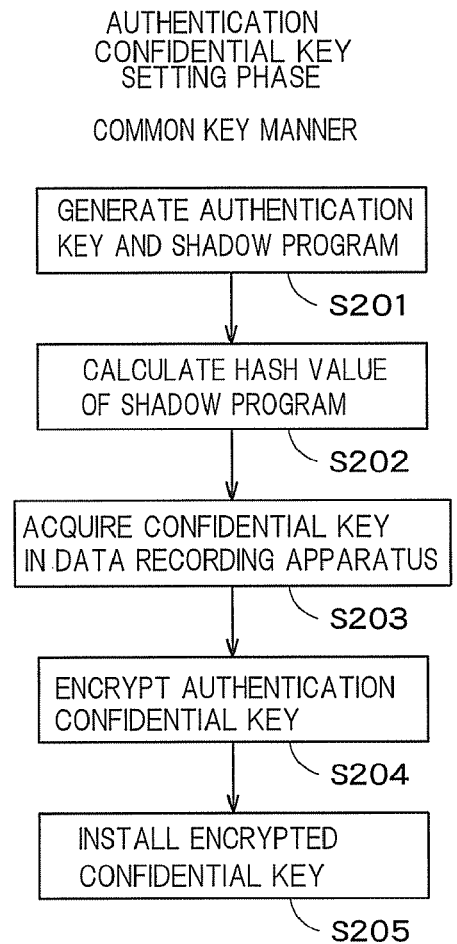
FIG. 19B is a flowchart showing one example of the phase for setting the authentication private key when the common key is used.

FIG. 19(*a*) is a flowchart showing one example of processing of the phase for setting the authentication private key when the public key is used, and FIG. 19(*b*) is a flowchart showing one example of processing of the phase for setting the authentication private key when the common key is used.

In the processing of FIG. 19(*a*), the shadow program and the authentication private key are firstly generated at production side of the data recording apparatus 3 or server side (step S191). The hash value (Hashvalue) of the shadow program is calculated (step S192), and the public key in the data recording apparatus 3 is acquired (step S193).

Next, the authentication private key (ServerKey) is encrypted based on Formula (5) (step S194), and the encrypted private key is stored in the encryption data storage not shown (step S195). When the data storage 3 does not have the encryption data storage, the encrypted private key may be stored in the MBR shadow storage with the shadow program.

$$\text{Output}=\text{Encrypt}(\text{ServerKey},\text{HashValue},\text{Key}) \quad (5)$$

In Formula (5), "Encrypt" is the same function as that of the second embodiment. That is, a first parameter is encrypted by using second and third parameters as keys, and the encrypted value is outputted as "Output". A value of the key stored in the key management unit 42 in the confidential information storage 15 is used as "Key".

When the public key is used as the encryption manner, the authentication private key is encrypted by the public key corresponding to the private key managed by the key management unit 4 in the confidential information storage 15. The server 1 may acquire the public key via a network from the data recording apparatus 3 and may encrypt the acquired private key, or may encrypt it when assembling the data recording apparatus 3, or the authentication private key may be distributed from the server 1 on the network and may be encrypted by using the public key in the key management unit 42 by the program in the data recording apparatus 3 when the data recording apparatus 3 is installed.

The processing in FIG. 19(*b*) is different from that in FIG. 19(*a*) in only the processing of step S203. In step S203, the private key in the data recording apparatus 3 is acquired. In step S204, the private key is encrypted.

When the common key is used as the encryption manner, if the server 1 also manages the value stored in the key management unit 42 in the confidential information storage 15, the sever 1 may perform the encryption processing of the authentication private key, or the encryption processing may be performed when the data recording apparatus 3 is assembled, or the server 1 may distribute the authentication private key on the network and the distributed authentication private key may be encrypted by the private key in the key management unit 42 by the program in the data recording apparatus 3

Next, the processing for authenticating with the server 1 by using the server program and the private key will be described.

FIG. 20 is a flowchart showing one example of processing of the shadow program according to the fourth embodiment.

Generally, when the program is executed, the program is extracted on the main memory 27, and the processor 26a executes the program on the main memory 27. The shadow program is also extracted on the main memory 27 as well and executed by the processor 26a (step S211). The processing until the program is extracted on the main memory can be performed by the start-up program stored in the start-up program storage 21. The start-up program reads and executes the shadow program.

The shadow program sets the address and range of the main memory 27 to the main memory area designation register 53 in the processor 26a in order to designate that the hash value from which to which of the program information extracted on the main memory 27 should be calculated (step S212). The shadow program designates a program module in the shadow program extracted on the main memory 27, or the program module and a data module. The program start address is set to become a position included in the address area used for calculation of the hash value. In order to designate the address of the program executed after execution of the special instruction X, the address is set to the execution start address designation register 54.

After that, the shadow program issues the special instruction X for the processor 26a (step S213). The processor 26a executes the special instruction X. At this time, a value set to a specific register is referred and the hash value is calculated at a range of addresses of the main memory 27 designated by the value (step S214), and a command for designating that the calculated hash value is stored in the processor status management unit 49 in the confidential information storage 15 is issued (step S215). The processing of calculating the hash value and issuing the command is performed by the processor 26a by itself, but not by the program.

The confidential information storage 15 determines whether the received command is transmitted from the processor 26a or from the program executed by the processor 26a (step S216). Only when the received command has been transmitted from the processor 26a, the command is accepted, and when the received command has been transmitted from the program executed by the processor 26a, the command is rejected and the error is returned (step S217).

If the received command has been transmitted from the processor 26a, the hash value is set to the processor status management unit 49 (step S218).

After that, the general command processing unit 51 in the processor 26a executes the instruction corresponding to the address designated by the execution start address designation register 54. A code portion of the shadow program is designated to this address, and the processing of the shadow program is continued.

The shadow program transmits the command to decrypt data stored in the encrypted private key for server authentication (step S219). When the confidential information storage 15 receives this command, the encrypted private key is decrypted based on the following Formula (6).

$$Output=Decrypt(Input, RegisterValue, Key) \qquad (6)$$

In Formula (6), "Decrypt" is the same function as that of the second embodiment. That is, the value of the first parameter is decrypted by using the second and third parameters as keys, the decrypted value is outputted as "Output". "Input" is the encrypted authentication key for server authentication, and the value in the processor status management unit 49 is inputted to "RegisterValue". "Output" is the value of a plaintext (decrypted) private key for server authentication.

Next, the authentication processing with the server 1 is performed by using a value of the plaintext private key for server authentication (step S221). The processing procedure may be the same processing procedure as that described in the first to third embodiments.

With respect to the processing after the special instruction X is transmitted until the plaintext private key for server authentication is acquired, it is preferable to activate another program by occurrence of the interruption processing and to control the processor 26a so as not to transit to a debug mode.

Before ending the shadow program, it is preferable to delete an area including the plaintext private key for server authentication on the main memory 27, for example, by overwriting the area with another value.

As described above, the fourth embodiment has a characteristic in which "RegisterValue" is a value in the processor status management unit 49, i.e. a value which can be set by only the processor 26a. Generally, the processor 26a is realized by hardware. Since modification of the hardware is very difficult, it is also difficult to attack the processor status management unit 49 so that a value different from the hash value of the shadow program is stored in the processor status management unit 49. If the hash value of the shadow program stored in the confidential information storage 15 is not a valid value, it is impossible to acquire the plaintext private key for server authentication. Therefore, it can be assured that only the shadow program can decrypt the plaintext private key for server authentication, thereby safely protecting the password. Since the plaintext private key for server authentication can be distributed independently from the shadow program, it is unnecessary to update the shadow program even when the private key for server authentication is updated.

In the above embodiment, a configuration that the drive unit 4 does not have the data recording unit 6 has been explained for simplification. Instead of providing the data recording unit 6 in the drive unit 4 and protecting the private key for server authentication, the present embodiment is applicable even when the password used for the unlock control of the data recording unit 6 is protected.

FIG. 21 is a block diagram showing one example of schematic configuration of the data recording apparatus 3 according to the fourth embodiment capable of protecting the password for unlock control. The data recording apparatus 3 in FIG. 21 has the access controller 7 and the data recording unit 6 having the same internal configurations as those of FIG. 4, instead of those of FIG. 16. The data recording apparatus 3 in FIG. 21 is different from that in FIG. 4 as block configuration only in that another processor 26a different from the processor 26 in FIG. 4 is provided in FIG. 21.

In the same procedure as the procedure in which the shadow program and the encrypted private key for server authentication are installed in the data recording apparatus 3 based on the processing in FIG. 20, the shadow program and the encrypted password for unlock control in the data recording unit 6 may be installed. The password obtained by decrypting the encrypted password is used to unlock the data recording unit 6. This password is set to coincide with a value of the password stored in the host authentication unit 32 in the access controller 7.

The processing of installing the encrypted password may be performed when the data recording apparatus 3 is assembled, the encrypted password may be included in the shadow program of the data recording apparatus 3 at the time of assembling the data recording apparatus 3 to install it in the MBR shadow setting unit 34, the password may be generated in the server 1 on internet 2 and then the password may be transmitted to the data recording apparatus 3 and then the password may be encrypted based on the above formula by the shadow program in the data recording apparatus 3 to store the encrypted password in the encryption data storage not shown, or the shadow program including the encrypted password may be generated to transmit it to the data recording apparatus 3 via internet 2 in order to install the shadow program in the MBR shadow setting unit 34 by the data recording apparatus 3.

Next, the processing for unlocking the data recording unit 6 by using the shadow program and the password will be described.

FIG. 22 is a flowchart showing one example of processing of the unlock phase performed by the shadow program according to the fourth embodiment. FIG. 20 is different from FIG. 22 in the following characteristics. In FIG. 20, the private key for server authentication is decrypted as protection target by using the value in the processor status management unit 49. On the other hand, in FIG. 22, the password for unlocking the data recording unit 6 is protection target. However, the entire processing procedure in FIG. 22 is the same as that in FIG. 20.

The encrypted password is decrypted in step S240 to generate a plaintext password. After that, the authentication with the server 1 is performed (step S241). The authentication with the server 1 is successful, a value of the plaintext password is transmitted to the drive unit 4 and the lock controller 33 unlocks the data recording unit 6 (step S242). Step S242 may be performed based on the processing procedure described in the first to third embodiments. Therefore, only the specific shadow program can acquire the plaintext password, thereby safely protecting the password.

As described above, according to the fourth embodiment, the private key for server authentication and the encrypted password for unlock control in the data recording unit 6 are generated by executing the special instruction X by the processor 26a. Therefore, compared with the case of encrypting the private key and the password by the shadow program by itself, it is possible to more safely perform encryption processing and there is few likelihood that algorism of encryption is illegally decrypted.

Fifth Embodiment

In the fourth embodiment, the shadow program is a plaintext program not encrypted or even if the shadow program is encrypted, the key for encrypting the shadow program is included in the shadow program. The fifth embodiment has a characteristic in which before the shadow program is installed in the equipment, the shadow program by itself is encrypted in advance, and the encrypted shadow program and the key for decrypting the encrypted shadow program are distributed separate from each other.

Schematic configuration of the data recording apparatus 3 according to the fifth embodiment is the same as that of FIG. 16. In the fifth embodiment, prior to the processing of unlocking the data recording unit 6 by using the shadow program and the password, the processing for installing the encrypted program key and the shadow program in the data recording apparatus 3 is performed. In order to perform the install processing, the shadow program and the plaintext password are firstly generated.

FIG. 23 is a drawing showing one example of structure of the shadow program according to the fifth embodiment. The shadow program is composed of a plaintext code portion 71, an encryption code portion 72 and a data portion 73.

The plaintext code portion 71 includes a portion firstly executed in the shadow program, i.e. an entry point 74.

The encrypted code portion 72 is a portion executed subsequent to the plaintext code portion 71. The portion 72 is encrypted by the program key described below.

The data portion 73 is a portion in which data possessed by the shadow program is stored.

The program key is a key for encrypting the encrypted code portion 72, and is prepared separate from the shadow program. The program key "ProgramKey" is encrypted by using the hash value "HashValue" in the program including at least the encrypted code portion 72 based on the following Formula (7).

Output=Encrypt(ProgramKey,HashValue,Key)   (7)

In Formula (7), "Encrypt" is the same function as that of the second embodiment. That is, the value of the first parameter is encrypted by using the second and third parameters as keys and the encrypted value is "Output". As "Key", a value of the key stored in the key management unit 42 in the confidential information storage 15 is used.

When the public key is used for the encryption manner, the program key is encrypted using the public key corresponding to the private key managed by the key management unit 42 in the confidential information storage 15. The server 1 may acquire the public key from the data recording apparatus 3 via the network to encrypt the program key, may encrypt the program key when the data recording apparatus 3 is assembled, or the program key may be distributed from the server 1 on the network and when the data recording apparatus 3 installs the program key, the program in the data recording apparatus 3 encrypts the distributed program key by using the public key managed by the key management unit 42 to store the encrypted program key.

When the common key is used for the encryption manner, if the value stored in the key management unit 42 in the confidential information storage 15 is managed by the server 1, the encryption processing of the above program key may be performed by the server 1, or may be performed when the data recording apparatus 3 is assembled, or the program key may be distributed from the server 1 on the network and when the data recording apparatus 3 installs the program key, the program in the data recording apparatus 3 may encrypt by using the program key managed by the key management unit 42 to store the encrypted program key.

Next, the processing of decrypting the shadow program will be described. FIG. 24 is a flowchart showing one example of decryption processing procedure performed by the shadow program according to the fifth embodiment.

Firstly, the processor 26a executes the start-up program stored in the start-up program storage 21, and reads the shadow program from the start-up program. A portion firstly executed in the shadow program is an entry point 74 of the plaintext code, i.e. ordinarily, the first address in the plaintext code (step S251).

Next, in order to designate that the hash value from which to which should be calculated when the special instruction X in the processor 26a is executed, the address and the range is set to the main memory range designation register 53 in the processor 26a (step S252). The range includes at least the encrypted code portion, and contents of the main memory 27 have to coincide with contents used when the above program key is encrypted.

After that, the shadow program issues the special instruction X for the processor 26a. The processor 26a executes the special instruction X in the same manner as that of the fourth embodiment (step S253). After that, in the same processing procedure as steps S194 to S198 in FIG. 22, the hash value is accumulated to the processor status management unit 49 (steps S254 to S258).

Next, the shadow program transmits the commands for decrypting the encrypted program key to the confidential information storage 15 (step S259). The encrypted program key is preliminarily stored in the encryption data storage not shown in the host unit 5, included in the shadow program, or acquired from the server 1. The confidential information storage 15 receives the command and decrypts data based on the following Formula (8).

Output=Decrypt(ProgramKey,HashValue,Key)   (8)

In Formula (8), "Decrypt" is the same function as that of the second embodiment. That is, the value of the first parameter is encrypted by using the second and third parameters as keys and the encrypted value is "Output". "Input" is the encrypted program key, and the value in the processor status management unit 49 is inputted to "RegisterValue". "Output" is the value of the plaintext program key.

The shadow program uses the plaintext program key, and decrypts the encrypted code portion (step S261). After that, the instruction included in the plaintext code portion is executed.

After that, in the shadow program of the encrypted code portion, the server authentication is performed, or when the data recording unit 6 in the drive unit 4 is locked, the unlock processing is performed. As a manner of acquiring the confidential data such as the private key for server authentication and the password for unlocking the data recording unit 6 in the shadow program, there are (1) a manner of preliminarily embedding the confidential data in the encrypted data, and (2) a manner of embedding the key for decrypting the confidential data in the encryption data, embedding the encrypted confidential data in the data portion 73, and then decrypting the confidential data of the data portion 73 by using the key embedded in the encryption code portion 72.

The hash value of the encrypted code portion is embedded in the encrypted code, and a processing for checking whether the hash value coincides with a value of the processor status management unit 49 in the private information management unit is performed, and if not coincide, the error processing may be performed without performing subsequent processing.

As described above, according to the fifth embodiment, the shadow program and the program key used for decryption of the shadow program are separately encrypted and stored. The shadow program is encrypted while it is stored in the MBR shadow storage 35. Therefore, even if an attacker acquires the shadow program in a form of a file or image data, the analysis of the shadow program is difficult because it is encrypted. The program key for decrypting the encrypted shadow program becomes a plaintext status only when the shadow program is executed. Therefore, it is not also easy to decrypt the program key. Furthermore, even if the confidential data is included in the shadow program, there is no likelihood that the confidential data is decrypted. Therefore, it is possible to safely include another data such as the confidential data for server authentication and the password for unlocking the data recording unit 6.

Since the shadow program and the program key are stored in the shadow storage 35 in an encrypted state, if the server 1 preliminarily generates the encrypted shadow program and the program key, it is unnecessary to worry about leak on the communication path between the server 1 and the data recording apparatus 3. Therefore, it is possible to safely and easily perform a work of updating and distributing the shadow program and the program key by the server 1.

Lastly, roles of various keys and passwords described in the above embodiments will be collectively described below. The program key is a key used for decrypting the program. The password is a value used for unlocking the drive unit 4. The private key for server authentication is a key used for performing the authentication with the server. The private key of the key management unit 42 is a key which is stored in the key management unit 42 and used by the confidential information storage 15b on the purpose of encrypting and decrypting the input data. These keys and passwords are used by the following sequence.

1) The encrypted program key is decrypted by the private information storage. The encrypted program key is generated by using the private key in the key management unit 42. The encrypted program key is stored in the encrypted data storage, included in the shadow program, or is received from the server.
2) The program is decrypted by using the program key.
3) The encrypted password and the private key for server authentication are decrypted, and the decrypted password and private key are acquired. The encrypted password and the encrypted private key for server authentication are included in the shadow program.
4) The decrypted private key for server authentication is used to perform the server authentication.
5) The decrypted password is used to unlock the drive unit 4.

Recently, in addition to the conventional power generator such as atomic energy and heat power, by using renewable energy such as solar power and wind power, a next generation electric power network system, i.e. a smart grid, is constructed to stabilize power quality.

Figure 25:
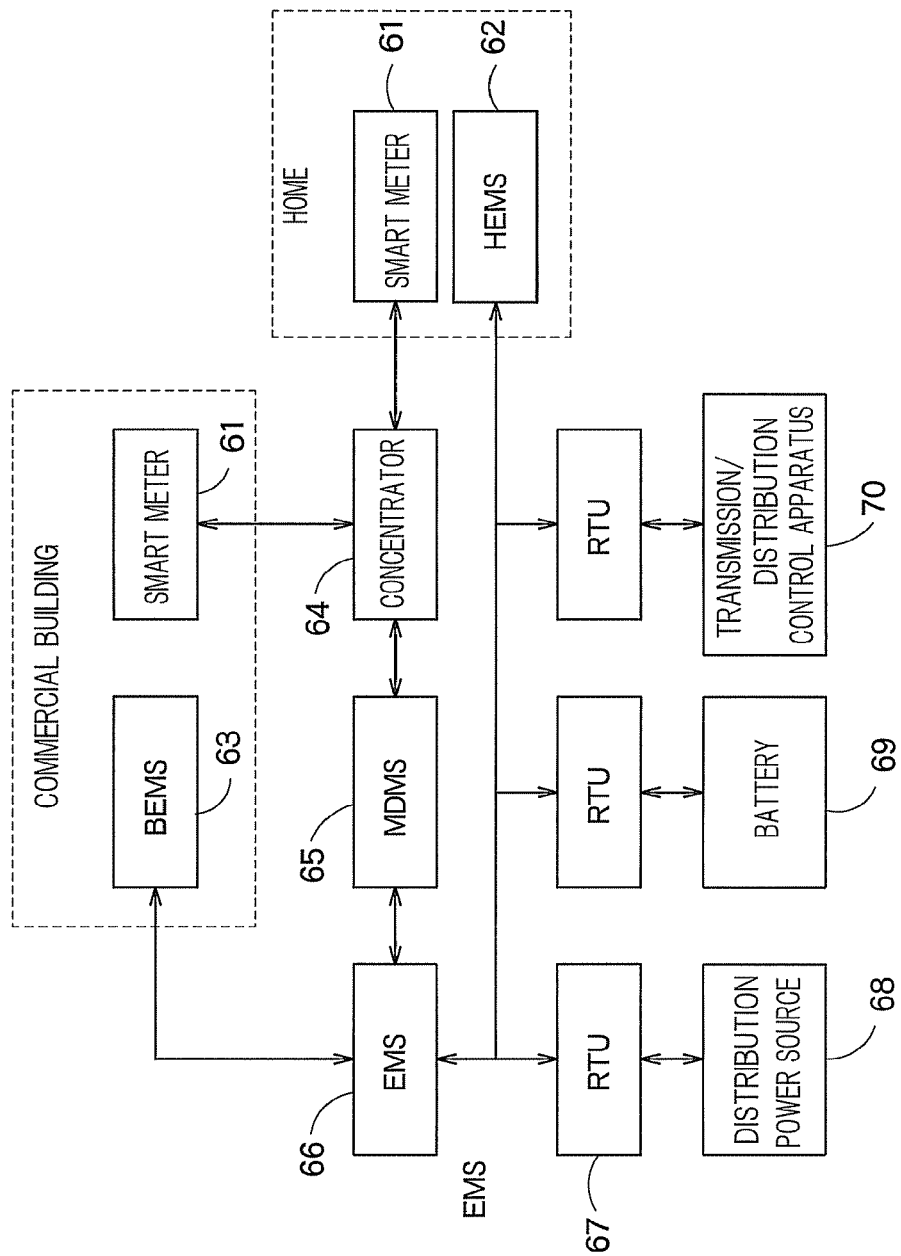
FIG. 25 is a block diagram showing one example of the next generation electric power network system.

FIG. 25 is a block diagram showing one example of schematic configuration of the next generation electric power network system. As shown in FIG. 25, in the next generation electric power network system, a mart meter (SM) 61 for aggregating the electric power usage amount and a home server (HEMS: Home Energy Management System) for managing home electric appliances 62 are installed in each home. By taking a commercial building into consideration, a server (BEMS: Building Energy Management System) 63 for managing the electric appliances in the building is installed by each building. Every several SMs 61 are grouped by a relay unit called a concentrator 64, and communicate with an MDMS (Meter Data Management System) 65 via a communication network. The MDMS 65 receives and stores electric power usage amount at a constant interval. An EMS (Energy Management System) 66 performs electric power control such as transmitting a request for reducing electric power usage amount to the SM 61 or the home server 62 in each home based on information from electric power usage amount in a plurality of homes aggregated to the MDMS 65 or information from the sensor installed in electric power network system. The EMS 66 controls a distribution power source 68 such as a solar power generation or wind power generation connected to an RTU (Remote Terminal Unit) 67, a battery 69 connected to the RTU 67, and a transmission/distribution control apparatus 70 for controlling the power generation side connected to the RTU 67. The EMS 66 performs control for stabilizing voltage and frequency in the entire grid.

The MDMS 65 and the concentrator 64 are connected via network 71, the BEMS 63 and the EMS 66 are also connected via the network 71, the EMS 66 and the HEMS 62 are also connected via the network 71. The program operated by the smart meter 61 may store the private information such as privacy information.

In the configuration shown in each of the above described embodiments, if the data recording apparatus 3 is installed in the smart meter 61, and the MDMS 65 is provided with the service providing server 1, the information providing system according to each embodiment is also applicable to the next electric power network system.

By applying the third embodiment, it is possible to easily distribute the shadow program via the server 1. By including a portion of the program executed by the smart meter 61 in the shadow program, it is possible to surely prevent modification of the program and to safely update the program.

At least a portion of functions performed by the above-mentioned information recording apparatus may be constituted by at least one of hardware and software. When constituted by software, a program of executing at least a portion of the functions performed by the information recording apparatus is stored in a recording media such as a floppy disk or CD-ROM, and is loaded to a computer to execute its program. The recording media is not limited to a portable media such a magnetic disk or an optical disk, but a fixed recording media such as a hard disk drive or a memory may be used to store the program.

The program of executing at least a portion of the functions performed by the information recording apparatus may be distributed via a communication line such as Internet. The program may be distributed via a wired line or a wireless line such as Internet at a state of encrypting, modulating or compressing the program, or may be distributed at a state of being stored in the recording media.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method of controlling a computer executed when the computer accesses a storage of the computer before an operating system is executed by the computer at a boot-up of the computer, the storage including:
   a first storage that stores the operating system, and
   a second storage that stores first information indicating whether or not the first storage is locked,
   the method comprising:
   responsive to the first information indicating that the first storage is locked, executing an authentication process, the authentication process including receiving authentication information input by a user, sending the authentication information to a server via wireless communication, and receiving an authentication result from the server via the wireless communication, the authentication result indicating whether the authentication succeeds.

2. The method according to claim 1, further comprising:
in a case where the first storage of the computer in which the operating system is stored is locked, upon the authentication process succeeding,
unlocking the first storage, and
executing the operating system.

3. The method according to claim 2, further comprising:
upon the authentication process succeeding, executing an unlock process to unlock the first storage using a password stored in the storage.

4. The method according to claim 1, further comprising:
upon the authentication process succeeding, executing an unlock process to unlock the first storage of the computer in which the operating system is stored using a password stored in the storage.

5. The method according to claim 4, wherein
the password is encrypted.

6. The method according to claim 4, wherein,
in a case where an address space of the storage is divided into a plurality of partitions, different passwords are required for different partitions.

7. The method according to claim 1, wherein
the authentication process requires different authentication information for different users.

8. The method according to claim 1, wherein,
in a case where information stored in the storage is encrypted, the information is kept encrypted unless the authentication process succeeds.

9. The method according to claim 8, wherein,
upon the authentication process succeeding, a decryption key is obtained from the storage to decrypt the information.

10. The method according to claim 1, wherein
the authentication process further requires information to identify the computer.

11. The method according to claim 10, wherein
the information to identify the computer includes at least one of a MAC address, a CPU ID, and a serial ID of the operating system.

12. The method according to claim 1, wherein
the method is executed based on a computer program, at least a part of the computer program being encrypted.

13. The method according to claim 1, wherein
the method is executed based on a computer program, at least a part of the computer program being downloaded into the computer.

14. The method according to claim 2, further comprising:
upon the authentication process succeeding, executing an unlock process to unlock the storage using second information transmitted from the server to the computer.

15. The method according to claim 14, wherein
the second information is generated using third information transmitted from the computer to the server.

16. The method according to claim 15, wherein
the third information is at least a part of the authentication information.

17. The method according to claim 14, wherein
the second information is encrypted.

18. The method according to claim 17, wherein
the second information is encrypted using third information transmitted from the computer to the server.

19. The method according to claim 1, wherein
the method is executed based on a computer program, the computer program being configured to be executed when the computer accesses LBA0 address of the storage.

* * * * *